United States Patent [19]
Sawabe et al.

[11] Patent Number: 5,307,110
[45] Date of Patent: Apr. 26, 1994

[54] PULSE-CONTROLLED CAMERA, METHOD FOR SETTING CONTROL REFERENCE POSITION THEREOF, AND METHOD FOR ADJUSTING MECHANICAL ERRORS IN PRODUCTION THEREOF

[75] Inventors: Kousaku Sawabe, Ichikawa; Daisuke Hata, Funabashi; Kenji Koyama, Yokohama, all of Japan

[73] Assignee: Ricoh Company, Ltd., Tokyo, Japan

[21] Appl. No.: 14,163

[22] Filed: Feb. 5, 1993

[30] Foreign Application Priority Data

Feb. 21, 1992 [JP] Japan .................................. 4-70273

[51] Int. Cl.⁵ .......................... G03B 9/08; G03B 13/36
[52] U.S. Cl. ..................................... 354/400; 354/439
[58] Field of Search ............. 354/400, 435, 439, 234.1

[56] References Cited

U.S. PATENT DOCUMENTS 4,959,675  9/1990  Seki et al. ............................ 354/400

FOREIGN PATENT DOCUMENTS 60-235125  11/1985  Japan .
62-220939   9/1987  Japan .
62-257136  11/1987  Japan .
2-58733     4/1990  Japan .

Primary Examiner—W. B. Perkey
Attorney, Agent, or Firm—Oblon, Spivak, McClelland, Maier & Neustadt

[57] ABSTRACT

A pulse-controlled camera has a single motor capable of conducting a drive of a photo-taking lens and a drive of opening and closing of shutter blades at a high speed with a high reliability and a high precision in a compact structure, in which mechanical errors in machining and assembling may be electrically adjusted and which can facilitate automatic assembling. The pulse-controlled camera comprises a basic reciprocating member which is rotated in a forward direction or in a backward direction with respect to a home position by a pulse motor. The forward rotation of the basic, reciprocating member from the home position also rotates a lens feeding member through a ratchet base plate in the forward direction, so that a cam action of the lens feeding member feeds a lens holding frame up o a position corresponding to a measured distance value. Then the basic reciprocating member rotates in the backward direction while leaving the ratchet plate at the position, passes the home position, and rotates a shutter blade opening and closing lever by an engaging pin thereof to open the shutter blades. The home position of the basic reciprocating member is set based on a timing when a home position signal generating portion interrupts a beam for detection of a photo interrupter.

19 Claims, 19 Drawing Sheets

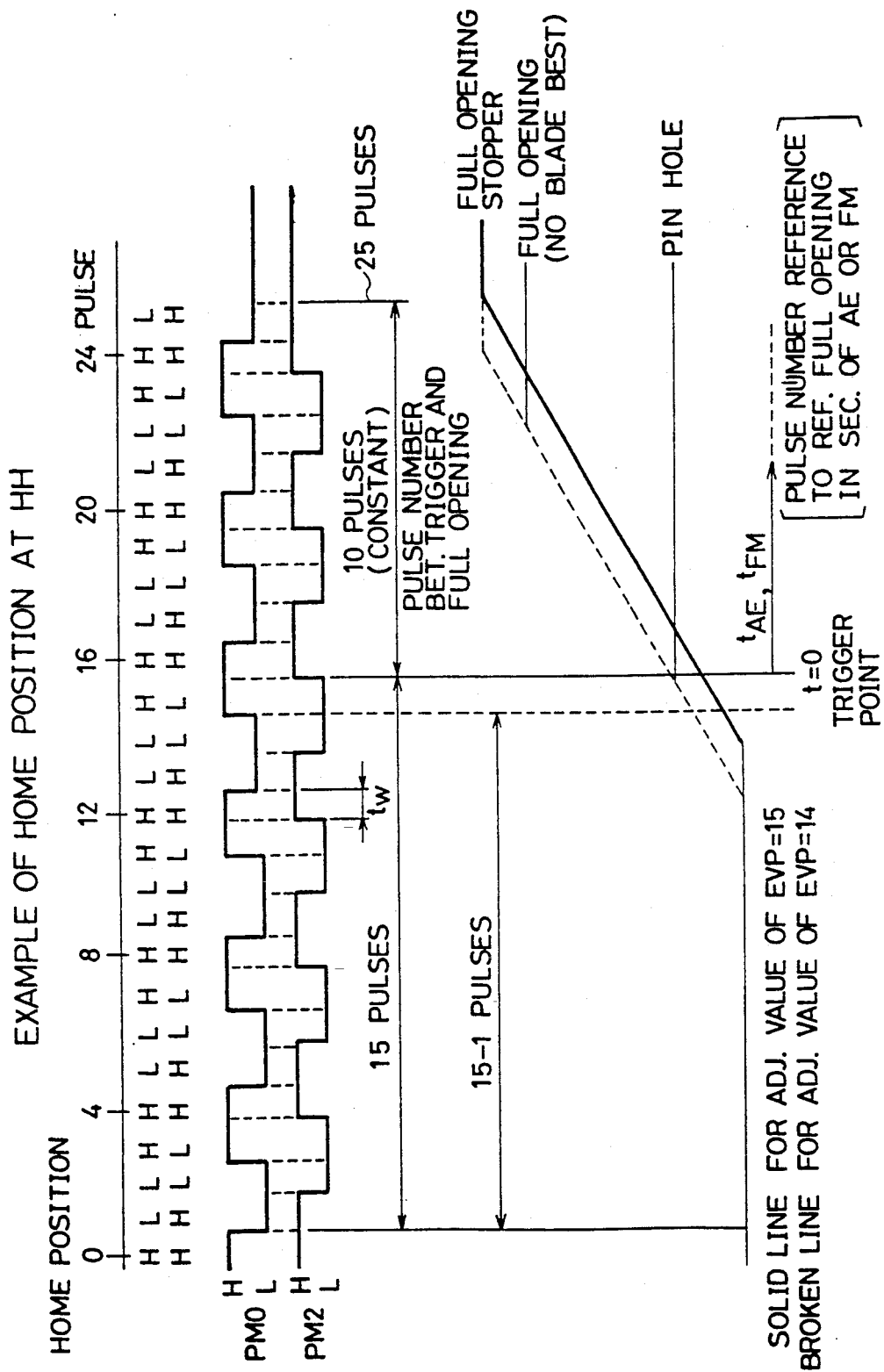

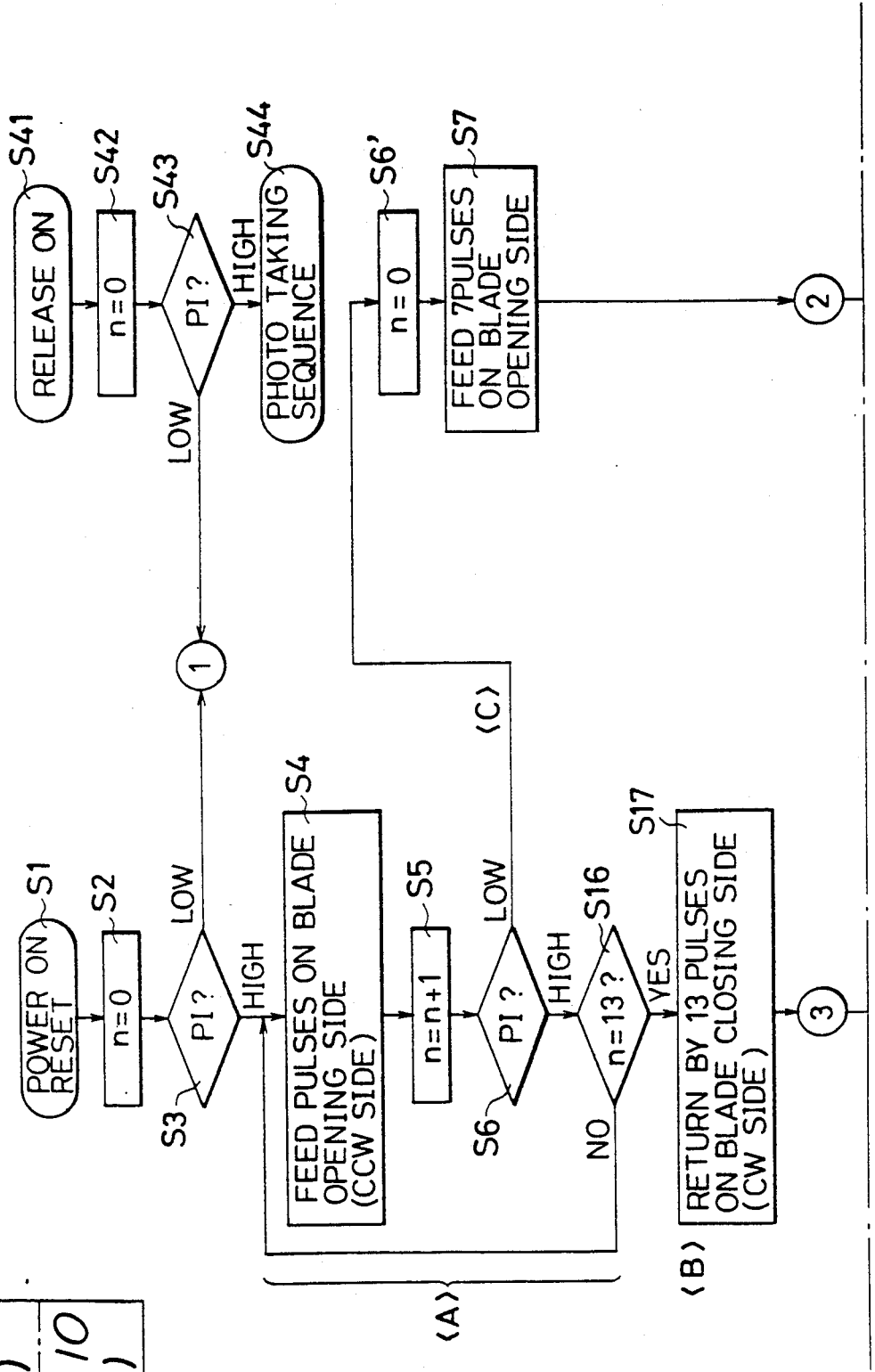

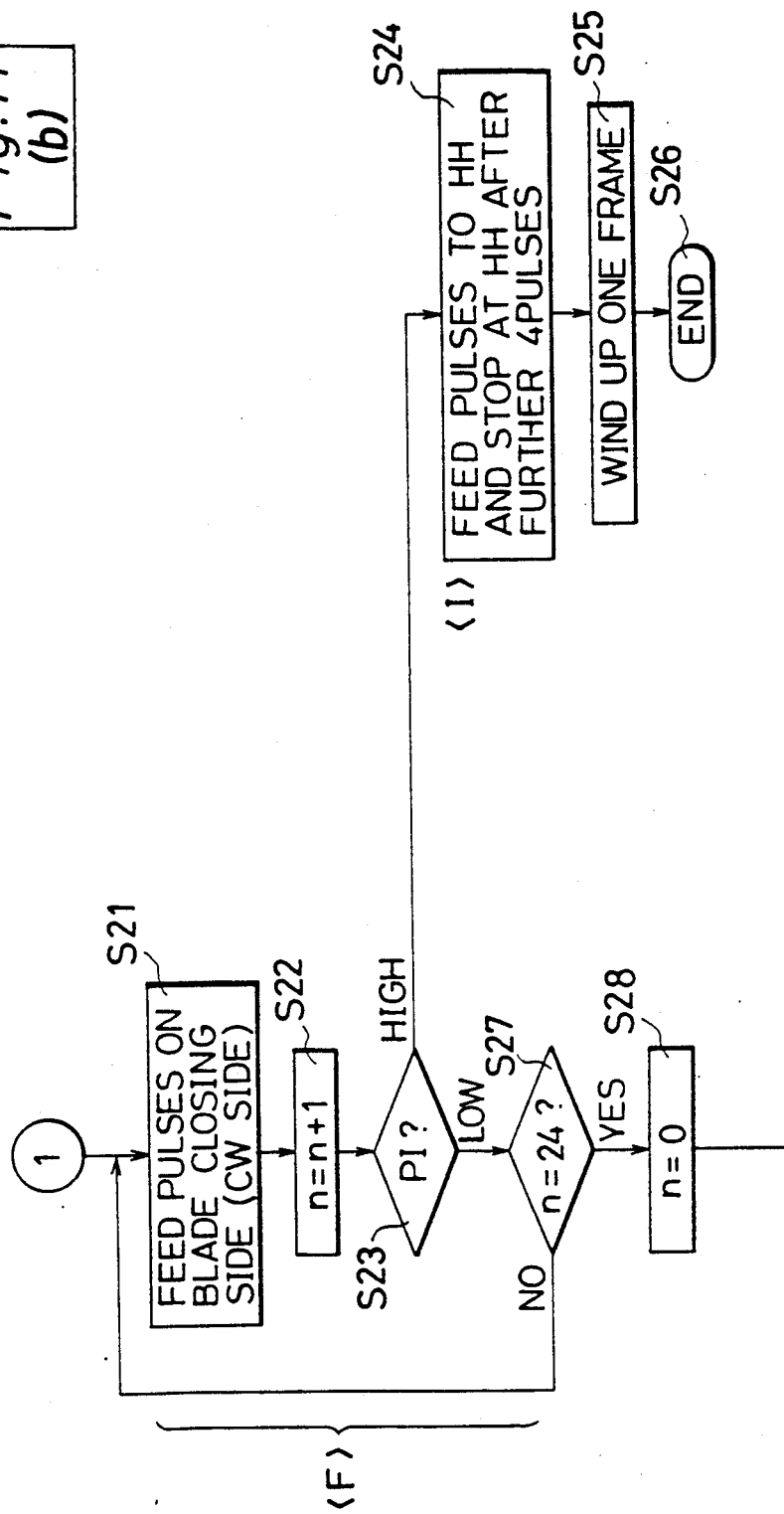

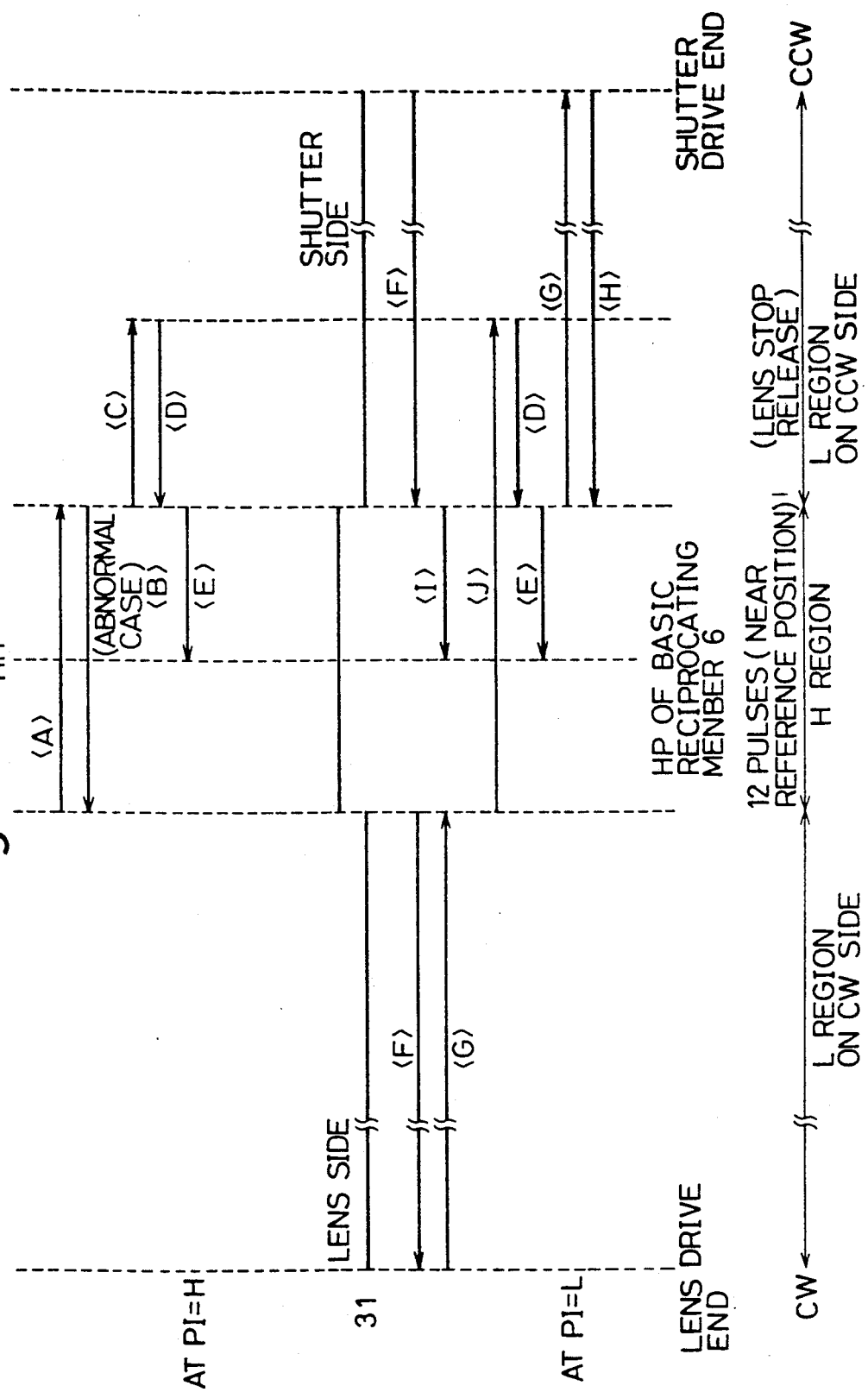

PULSE-CONTROLLED CAMERA, METHOD FOR SETTING CONTROL REFERENCE POSITION THEREOF, AND METHOD FOR ADJUSTING MECHANICAL ERRORS IN PRODUCTION THEREOF

BACKGROUND OF THE INVENTION

1. Field of the Invention

The present invention relates to a pulse-controlled camera of a type in which a basic reciprocating member is successively rotated in a forward direction and in a backward direction by a forward and backward rotational drive force of a a pulse motor. A feeding operation of a photo-taking lens is carried out by the forward rotation of the basic reciprocating member and a shutter mechanism is operated, by the backward rotation to follow. A method for setting a control reference position of the pulse-controlled camera, and to a method for adjusting mechanical errors in production of the pulse-controlled camera are also provided.

2. Description of the Related Art

The pulse-controlled camera of such a type is well known for example as disclosed in Japanese Laying-open (Kokai) Patent Application No. 62-220939, which was assigned to the same assignee as the present application. The Japanese Laying-open (Kokai) Patent Application No. 62-220939 discloses a technique in which a blade opening and closing ring (reference numeral 13 in the publication) or a drive gear (reference numeral 42 in the publication), which correspond to a basic reciprocating member in the present, invention, are capable of reciprocating. A reference position of the blade opening and closing ring 13, which corresponds to a home position in the present invention, is set as a signal corresponding to an-off motion of a position switch (reference numeral 25 in the publication) comprising a leaf switch, and the blade opening and closing ring 13 is successively rotated in the forward direction and in the backward direction from the reference position to carry out the feeding operation of the photo-taking lens and the exposure operation.

It is necessary in the pulse-controlled camera arranged as above that the blade opening and closing ring 13 is correctly located at the reference position or returned thereto before start of the photo-taking operation or after completion thereof in order to maintain high precision. Such a technique, that is, a technique in which a specific moving member is forced to return to the reference position to maintain the high precision of the camera, is also disclosed for example in Japanese Laying-open (Kokai) Patent Application No. 60-235125.

The Japanese Laying-open (Kokai) Patent Application No. 60-235125 discloses a technique in which, in a shutter device for camera having a step motor (reference numeral 2 in the publication), opening or closing a sector (reference numeral 1 3 in the publication) as a shutter blade, the reference position return detecting means (reference numeral in the publication) is preliminarily provided for detecting that the shutter blade 1 is located at the reference position. The detecting means 3 is used to detect whether the shutter blade 1 is located at the reference position before and after the exposure operation, and if the shutter blade 1 is not located at the reference position then the step motor 2 is rotated in the backward direction to force the shutter blade 2 to return to the reference position, thereby preventing the shutter blade 2 from being left in an open state.

It is normal to make an effort to shorten an overall time necessary for sequence operation as much as possible in case of a camera of a type in which a photo-taking sequence including a feeding operation of the photo-taking lens, an opening and closing operation of the shutter blade, as well as a film feed operation is systematically carried out by making use of a drive force of a motor.

For example Japanese Laying-open (Kokai) Patent Application No. 62-257136 discloses such a technique. The technique as disclosed in the Japanese Laying-open (Kokai) Patent Application No. 62-257136 concerns a compact pulse motor increased in operation speed in which a pulse rate of motor control upon opening and closing of shutter blades is made greater than that upon feeding of a photo-taking lens.

The technique as disclosed in the first Japanese Laying-open (Kokai) Patent Application No. 62-220939 presented various disadvantages. For example, corrosion proceeding or elastic degradation (so-called setting) occurs due to aged deterioration of the elastic leaf because the leaf switch 25 generates the on-off signal by a mechanical operation, whereby occurrence of such abnormal phenomena causes negative effects on the on-off operation and an external factor such as vibrations may make the on-off operation of the switch insecure.

A further problem is that a photographer cannot recognize such abnormal events and continues taking photographs in a qualitatively degraded condition after that.

There are various problems caused in view of production when the leaf switch 25 is employed.

In detail, an actual production causes errors within a tolerance in each of the mechanisms such as the photo-taking lens feeding mechanism and the shutter mechanism. It is usual that errors present in one mechanism are different from those in other mechanisms. In order that the blade opening and closing ring 13 is correctly combined with the photo-taking lens feeding mechanism and the shutter mechanism, having different errors from each other, a final position setting operation of the position switch 25 must be manually adjusted for each camera by trial and error.

The manual operation with adjustment, however, would be a major factor to increase the production cost on the one hand and a cause to impede the automatic assembling of a camera on the other hand.

The technique as disclosed in Japanese Laying-open (Kokai) Patent Application No. 60-235125 can be successfully applied to a pulse-controlled camera of a type in which only the shutter device is controlled and driven by a single step motor. However, this device cannot be applied there as is to a pulse-controlled camera of a type in which the photo-taking lens feeding operation and the shutter blade opening and closing operation are successively carried out by a forward motion and a backward motion of a single basic reciprocating member and the basic reciprocating member is driven by a single step motor, as in the present invention.

The failure of the application of this device here is caused by mechanical errors such as tolerance occurring in the production of mechanical parts and in assembling thereof.

The mechanical errors in machining are inevitably made in production of the moving member as the mechanical part, the sensor means for detecting a displacement amount and a stop position of the mechanical moving member. Such errors caused could allow appearance of sensor means which cannot detect the reference position of the moving member in a pulse width of the drive pulses.

If the sensor means, having such detection precision, is used to detect the reference position of the moving member as in the present invention, the moving member would fail to be correctly set at the reference position thereof in the technique as disclosed in Japanese Laying-open (Kokai) Patent Application No. 60-235125.

If the sensor means, having such detection precision, is used together with the technique as disclosed in Japanese Laying-open (Kokai) Patent Application No. 60-235125 arranging to secure the detection of the reference position of the moving member in any circumstance, the reference position of the moving member must be formed in width of at least one pulse or more. Such an arrangement, however, can permit detection about whether the moving member is located in the proximity of the reference position, but cannot permit detection about whether the moving member is correctly located at the reference position.

It should be understood that it is difficult to apply the technique as disclosed in Japanese Laying-open (Kokai) Patent Application No. 60-235125 having such an antinomic problem as described to the pulse-controlled camera as in the present invention, simply as it is.

A simple increase in pulse rate of motor control may not be sufficient in precision to increase the operation speed of the photo-taking sequence to a high speed.

For example, in a camera conducting the exposure control using shutter blades also serving as a stop, has a stop aperture formed by forcedly stopping the opening operation of the shutter blades in the middle thereof, so that the setting precision of timing to stop the opening operation of the shutter blades and the dispersion of mechanical operation delay are directly related to the precision in forming the aperture.

In this case, as the opening speed of the shutter blades becomes slower, the setting precision of the stop timing increases and the dispersion of the mechanical operation delay becomes smaller. Thus, the low opening speed of the shutter blades would be advantageous in view of the precision.

Accordingly, the shortening of the operation time must be considered taking into account the operation precision of the photo-taking sequence. The technique as disclosed in Japanese Laying-open (Kokai) Patent Application No. 62-257136 as described above lacks such consideration, and, therefore, the technique cannot be applied to the pulse-controlled camera as in the present invention, as it is.

If a camera is operated at a high precision, another problem would occur in relation with the production cost.

Since the mechanical means to conduct the lens feeding operation and the opening and closing operation of the stop and shutter blades are made by combining mechanical members, it is usual that production errors and assembling errors are made in machining and assembling of the mechanical members.

If the operation precision of camera is maintained at a high precision by suppressing errors in production as much as possible by increasing the machining precision of the mechanical members and the assembling precision thereof, the production cost would be extremely increased. Therefore, a novel method is desired to appear to enable the high precision of camera while preventing the increase in production cost.

SUMMARY OF THE INVENTION

The present invention has been accomplished taking into account the above circumstances. It is one object of the present invention to provide a pulse controlled camera of a type in which a pulse motor is rotated to drive focusing means for feeding a photo-taking lens to an in-focus position corresponding to an object distance (film-to-subject distance) and shutter opening means for opening shutter blades at least to a position of correct stop aperture corresponding to a correct exposure amount obtained by measuring a luminance of a subject, whereby shortening an operation time while maintaining an excellent operation precision in photo-taking sequence. Another object is to provide efficiency in production while maintaining a high precision of the camera, and permitting a compact structure of a lens barrel and neighbors thereof. Another object is to provide a method for setting a control reference position of the pulse-controlled camera, and to provide a method for adjusting mechanical errors in production of the pulse-controlled camera.

The present invention may be realized in a first embodiment including a basic reciprocating member driven by a pulse motor such that said reciprocating member moves in a forward direction from a control reference position by an amount corresponding to a measured distance and thereafter returns to said control reference position. The reciprocating member then moved in a backward direction from said control reference position and thereafter returns to said control reference position. Also included is a distance setting member arranged such that when the basic reciprocating member is driven in the forward direction from the control reference position, the distance setting member is driven in dependence from the control reference position against a biasing force provided on itself and has a photo-taking lens displaced in a direction of an optical axis thereof by an amount corresponding to the measured distance from a feeding start reference position. Backstop means are also provided that is urged with an urging force to make an engagement with the distance setting member to prevent the distance setting member from being driven by the biasing force in the backward direction, but pressed by the basic reciprocating member against the urging force for engagement to release the engagement with the distance setting member only when the basic reciprocating member returns to the control reference position from a position to which the basic reciprocating member is driven in the backward direction. A shutter opening and closing means are included that are operated to open and close shutter blade of an aperture. The shutter means operates when the basic reciprocating member is driven in the backward direction from the control reference position and operated to close the shutter blade when the basic reciprocating member returns to the control reference position from the position to which the basic reciprocating member is driven in the backward direction. In addition, a photoelectric detection means disposed in parallel with the optical axis of the photo-taking lens is included to detect a position of the basic reciprocating member.

The invention may also be realized in a second embodiment including the basic reciprocating member, distance setting member, backstop means, shutter opening and closing means and photoelectric detection means of the first embodiment. Further provided in the second embodiment is that the photoelectric detection are arranged to photoelectrically detect a predetermined proximate position set in the proximity of said control reference position as a change of an output signal thereof. Region border position detecting means are also included and arranged to detect a position where the output signal of the photoelectric detection means is changed by driving said pulse motor in the forward direction or in the backward direction.

Also included in the second embodiment are electric control means for further rotating said pulse motor in the same direction over the position where the output signal of the photoelectric detection means is changed, after the region border position detecting means has detected a border position, and for electrically setting the control reference position by stopping the pulse motor when a supply phase to the pulse motor becomes a phase preliminarily determined.

The object of the present invention can also be achieved in a third embodiment by a method for setting a control reference position of a pulse-controlled camera in which a pulse motor conducts drives of an operation to feed a photo-taking lens to an in-focus position depending upon an object distance and of an operation to open a shutter blade at least up to a position of a correct stop aperture based on a correct exposure amount depending upon a luminance of a subject.

The steps include setting the control reference position of the camera between a feeding start reference position from which the photo-taking lens is started feeding to the in-focus position and an exposure start reference position from which the shutter blade is started opening to the position of correct stop aperture, and setting at least one predetermined proximate position in the proximity of the control reference position.

The step of photoelectrically detecting is included to detect a change in an output signal of photoelectric detection means a border position between a region ranging from the control reference position to said predetermined proximate position and an outside region extending outside of the predetermined proximate position opposite to the control reference position.

Driving the pulse motor in at least one direction of forward and backward directions to detect a position where the output signal of the photoelectric detection mean is changed; and applying a predetermined number of drive pulses to said pulse motor from the position where the output signal of said photoelectric detection means is changed, when said border position is detected by the output signal change of said photoelectric detection means, whereby said control reference position is set in an electrically controlled manner.

The shutter opening means if for opening the shutter blades at least up to the position of correct stop aperture corresponding to an correct exposure amount obtained by measuring a luminance of a subject, and has at least the object distance calculating means for calculating an object distance at that time based on object distance information from automatic distance measuring means. The correct exposure calculating means is for calculating the correct exposure amount at that time by measuring the luminance of the subject, the basic reciprocating member rotated in the forward direction or in the backward direction by the forward and backward rotation drive of the pulse motor. The photoelectric detection means is for detecting a condition of the basic reciprocating member as a change in output signal when the basic reciprocating member is located at the predetermined proximate position of the home position (control reference position), and for arithmetically setting the home position based on the change in output signal. The backstop means is for stopping the photo-taking lens at a position having been fed and for releasing the stop condition of the photo-taking lens by the rotational motion of the basic reciprocating member toward the predetermined direction (by second forward rotation. The lens return means is for returning the photo-taking lens from the fed position to the feeding start reference position when the photo-taking lens is released from the stop condition by the backstop means.

The predetermined number of drive pulses set based on the calculation value of the object distance calculating means are applied to the pulse motor to rotate the basic reciprocating member by a rotation amount corresponding to the applied drive pulse number from the home position, for example, in the forward direction, whereby the photo-taking lens is fed from the feeding start reference position preliminarily set, to an in-focus position.

The predetermined drive pulse number is a drive pulse number calculated with respect to the home position or a drive pulse number calculated with respect to a calculation start position preliminarily set at a position offset from the home position.

After the forward rotation, the basic reciprocating member is rotated in the backward direction from the in-focus position toward the home position by applying to the pulse motor a drive pulse number same in number as the predetermined drive pulse number applied upon the forward rotation of the basic reciprocating member but different in directionality, or, a number of successive drive pulses different in directionality.

In this occasion, the photo-taking lens is stopped at the fed position by the backstop means, so that only the basic reciprocating member is rotated toward the home position.

The basic reciprocating member rotates in the backward direction toward the home position and returns to the home position as discussed herein. In case that the basic reciprocating member is rotated by the predetermined number of drive pulses applied to the pulse motor, the basic reciprocating member returns to the home position at the time when the drive pulse number is reached. Alternatively, in case that the basic reciprocating member is rotated by the number of successive drive pulses, the basic reciprocating member returns to the home position by a home position setting operation of the photoelectric detection means which is operated when the basic reciprocating member has reached the predetermined proximate position near the home position.

Once the basic reciprocating member returns to the home position as described, a number of drive pulses necessary for rotation of the basic reciprocating member from the home position at least to the exposure start reference position of the shutter blades are then applied to the pulse motor.

The basic reciprocating member is rotated in the backward direction from the home position by the rotation amount corresponding to the drive pulse number applied, thereby to locate the shutter blade at the exposure start reference position.

After that, by a time control or a pulse number control of the basic reciprocating member, the shutter blades are opened from the exposure start reference position to a position of correct stop aperture which is determined by the correct exposure amount calculated by the correct exposure calculating means.

When the shutter blades are opened up to the position of correct stop aperture, the pulse motor is rotated in the backward direction to rotate the basic reciprocating member from that position toward the home position.

In this case, the basic reciprocating member rotates from the position where the shutter blades are opened up to the correct stop aperture, through the exposure start reference position toward the home position, and, when the basic reciprocating member rotates up to a predetermined position over the exposure start reference position, the basic reciprocating member works on the backstop means to release the stop of the photo-taking lens by the backstop means. Thus, the photo-taking lens returns to the feeding start reference position by the lens return means.

The basic reciprocating member continues rotating in the forward direction after the photo-taking lens has returned to the feeding start reference position, reaches the predetermined proximate position near the home position, and finally returns to the home position by the home position setting operation of the photoelectric detection means after reached the proximate position.

As seen from the above description, according to the present invention, the pulse-controlled camera may be attained with the following advantages: first, the return operation of the basic reciprocating member to the home position (control reference position) may be accurately carried out with reliability, free of troubles such as elastic degradation and inferior contact which may occur in use of the conventional position switch for example comprised of a leaf switch or of a slide switch; second, the operation time may be shortened while maintaining the high operation precision of the pulse motor even though the single pulse motor can conduct the photo-taking lens feeding operation and the shutter blade opening and closing operation; third, the adjustment is highly adaptable in a wide range with a simple and easy operation whereby without necessity of high precision in machining and assembling, the operation precision may be set high and the automatic assembling may be readily achieved; fourth, the simplification of structure and the reduction in space may be effectively attained.

Also, according to the present invention, it can be checked in use of the camera whether the basic reciprocating member is returned to the home position or not. If the basic reciprocating member is not returned correctly to the home position, or, if there occurs the abnormal event in the camera, the photographer may be informed of that fact by employing the method for setting the control reference position of the pulse-controlled camera.

Further, according to the present invention, the method for adjusting mechanical errors in production of the pulse-controlled camera may be provided, which can accurately and easily adjust in a pure electric manner the mechanical errors related to the feeding operation of the photo-taking lens to the in-focus position and to the opening operation of the shutter blades to the position of correct stop aperture in the pulse-controlled camera having the above advantages.

Further objects and advantages of the present invention will be apparent from the following description of the preferred embodiments of the invention as illustrated in the accompanying drawings.

BRIEF DESCRIPTION OF THE DRAWINGS

FIGS. 5(i) and 5(ii) is a control block diagrams to show a structure of electric circuits related to a total control system of the pulse-controlled camera as shown in FIG. 1;

FIG. 9 is a partial timing chart to illustrate an operation of shutter blade opening in the pulse-controlled camera as shown in FIG. 1;

FIG. 12 is a relative motion relational drawing to schematically show a relation among a rotation position of the basic reciprocating member, a number of drive pulses applied to a pulse motor, and an output variation of a photo interrupter in the home position setting control of the basic reciprocating member used in the pulse-controlled as shown in FIG. 1;

DESCRIPTION OF THE PREFERRED EMBODIMENTS

A pulse-controlled camera according to the present invention will be described in detail based on the preferred embodiments as shown in the accompanying drawings.

Figure 1:
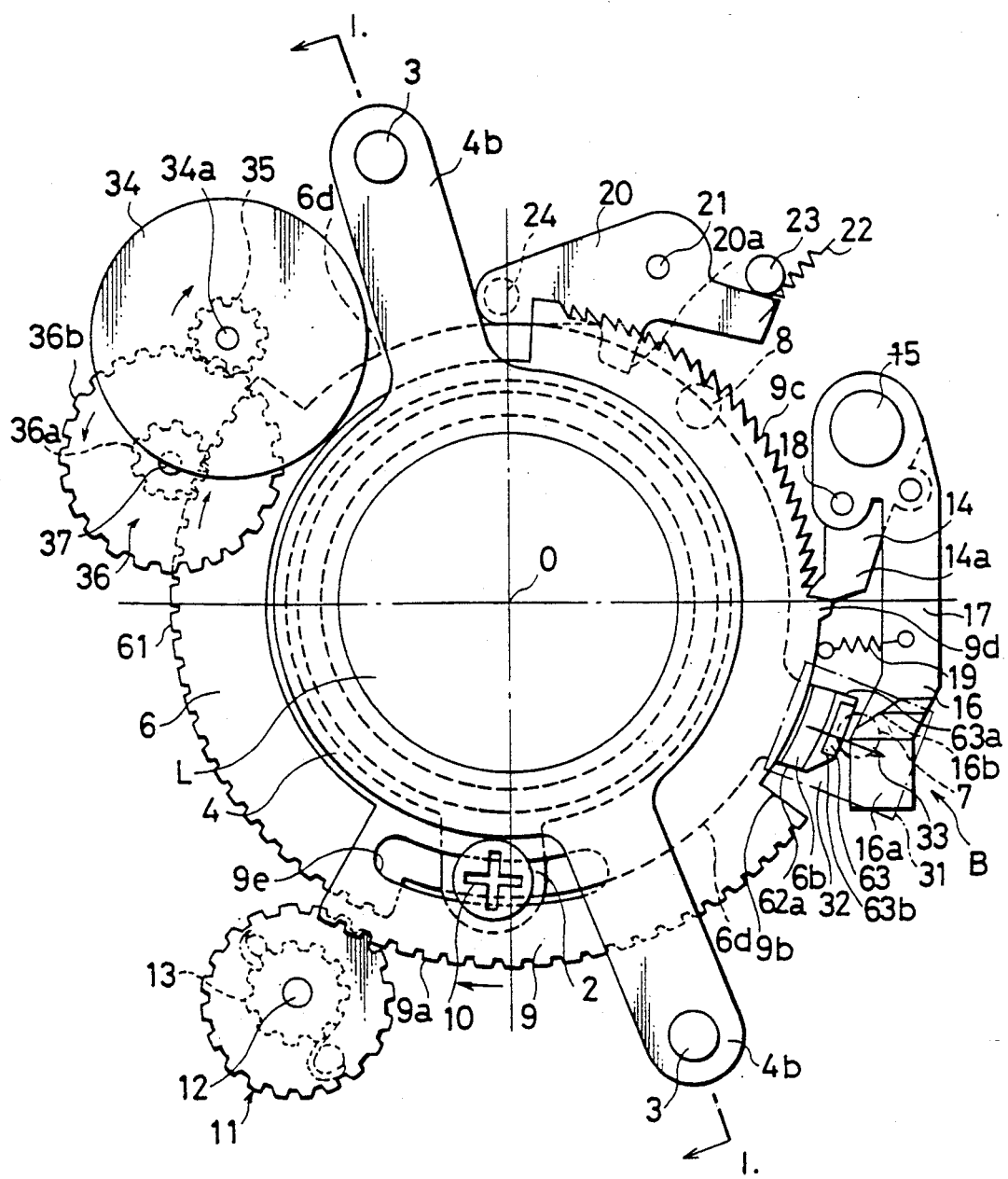
FIG. 1 is an elevational view to show a lens barrel portion of a pulse-controlled camera according to the present invention.
Figure 2:
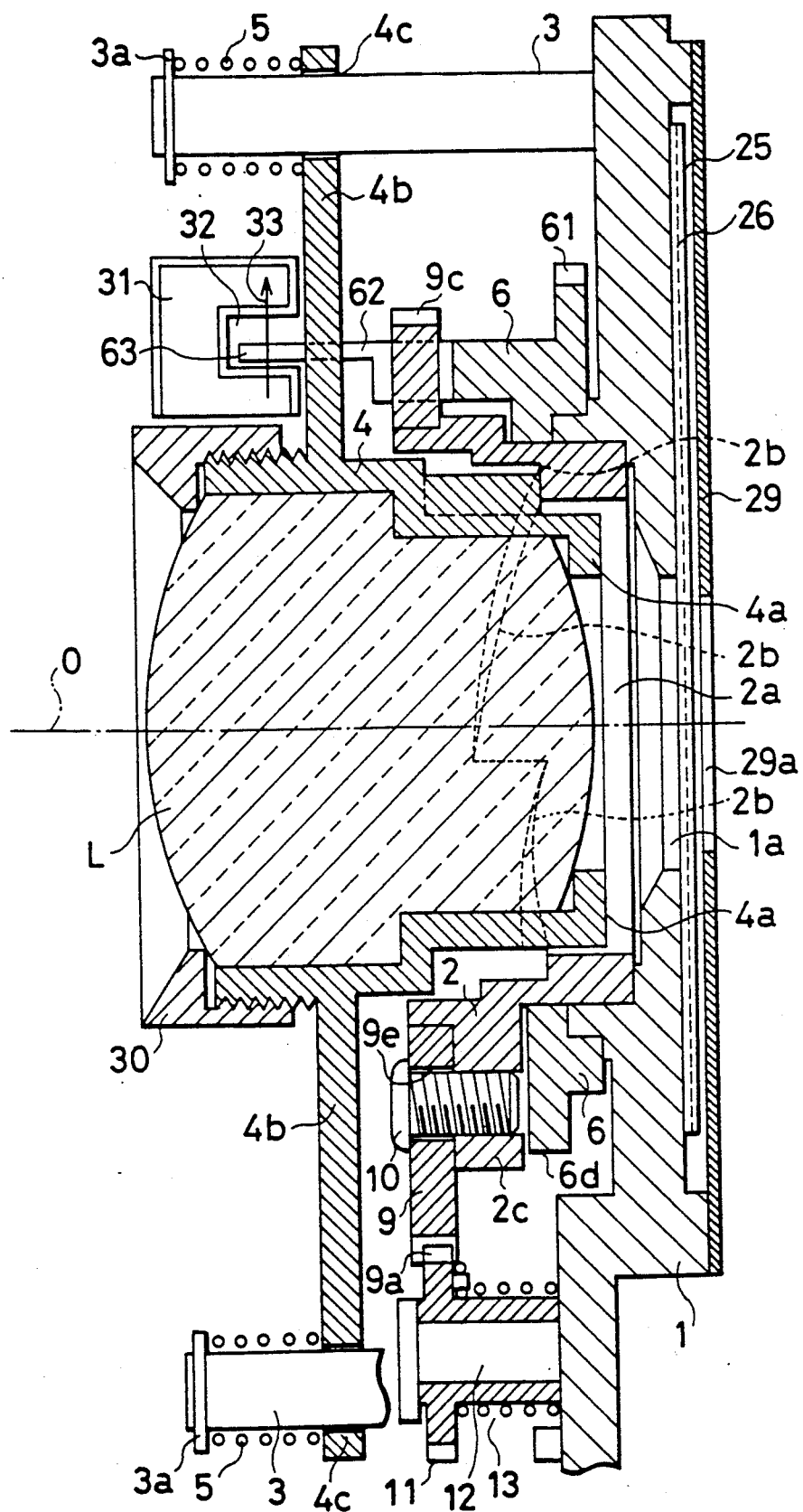
FIG. 2 is a sectional constitutional view of FIG. 1.
Figure 3:
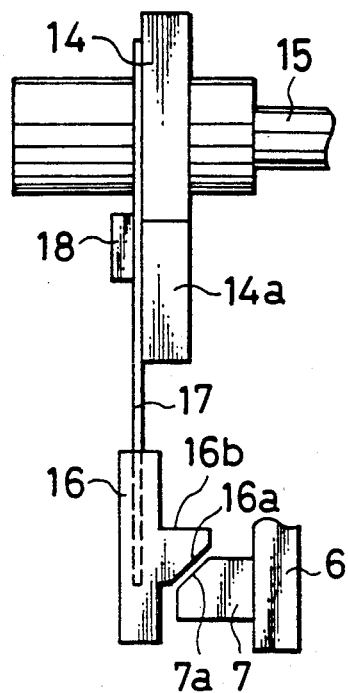
FIG. 3 is a partial side view as viewed in the direction of an arrow B in FIG. 1.

FIG. 1 is an elevational view to show a lens barrel portion of the pulse-controlled camera according to the present invention, FIG. 2 is a cross sectional view along A—A line in FIG. 1, and FIG. 3 is a partial side view as seen in the direction of an arrow B in FIG. 1.

In this embodiment, a direction of rotation in the drawings is defined such that the clockwise direction is a forward direction and the counterclockwise direction is a backward direction. However, the relation of direction may be reversed without any inconvenience.

In the pulse-controlled camera as shown in FIG. 1 to FIG. 3, the object distance (film-to-subject distance), which is originally continuous between the infinite distance and the closest distance, is preliminarily segmentally set (so-called quantized) as plural sections (for example thirty one sections). Then, a feeding amount (focusing amount) of a photo-taking lens L for each section of the object distance is set to correspond to each of plural focusing steps (for example thirty one steps) $L_1$–$L_{31}$ calculated starting from a lens initial position (feeding start reference position) as shown in FIG. 2 corresponding to the infinite distance. In focusing, the photo-taking lens L is fed in a stepwise manner from the lens initial position of FIG. 2 forward (to the left in FIG. 2) along a photographic optical axis O, which will be referred to as "optical axis", to carry out the focusing with the thirty on object distance sections.

This means that the object distance, which is originally analog, is defined to allow digital focusing.

The number of object distance sections and the number of focusing steps as set should be determine taking into consideration a depth of field of view of the photo-taking lens L in the respective focusing steps so that a subject may be clearly photographed anywhere at a distance ranging from the infinite distance to the closest distance.

Reference numeral 1 designates a lens barrel fixing portion of the pulse-controlled camera, which is provided with a photographic beam passing hole 1a for permitting a photographic beam to pass therethrough in a region located on the optical axis O.

Character L denotes a photo-taking lens built in the lens barrel fixing portion 1 through a lens holding frame 4, which may be arranged for example as a photo-taking lens comprised of one group of lens system as shown in FIG. 2. Alternatively, the photo-taking lens L may be arranged as a lens system of multiple lens groups, for example a lens system of two lens groups comprised of a front lens group and a rear lens group or a lens system comprised of more lens groups. In case of the lens system of two groups, the photo-taking lens L as shown in the drawings may be arranged as the front lens group for focusing and a rear lens group not shown may be located on the optical axis behind the stop position (the setting position of shutter blades 25 and 26).

Reference numeral 2 denotes a lens feeding member fit in the lens barrel fixing portion 1 as rotatable about the optical axis O in the forward direction or in the backward direction, which is arranged as a member constituting a part of a distance setting member as set forth in the appended claims.

The lens feeding member 2 has a photographic beam passing hole 2a for permitting a photographic beam to pass therethrough in the region located on the optical axis O, on which for example three face cam portions 2b are formed in three equally divided areas of inner end plane thereof for displacing the lens holding frame 4 along the optical axis O forward (to the left in FIG. 2) in cooperation with each other.

The three face cam portions 2b are formed in a shape which can accomplish the cam effect to accurately position the photo-taking lens L at each of the focusing steps $L_1$ to $L_{31}$, as described above. When the camera is in a non-operating state, the member is located at the lens initial position.

Although the lens initial position is set as the feeding start reference position in the embodiment as shown, the feeding start reference position may be set at a position fed by a small distance before the lens initial position.

Reference numeral 3 designates a pair of lens holding frame guide poles planted in the lens barrel fixing portion 1 in parallel with the optical axis O, each of which has a flange 3a near a tip of thereof. Numeral 4 represents a lens holding frame holding the photo-taking lens L inside the lens feeding member 2, a rear half of which is enclosed in the lens feeding member 2 in such a state that it can be relatively displaced in the direction of the optical axis O relative to the lens feeding member 2 and which can be rectilinearly displaced along the optical axis when a rear end plane thereof (the right end plane in FIG. 2) 4a is pushed by the face cam portion 2b of the lens feeding member 2.

The lens holding frame 4 is located at the lens initial position of FIG. 2 when the camera is in the non-operating state.

Two arms 4b are formed in a substantially opposing relation on the outer periphery of the lens holding frame 4. Further, a through hole 4c is formed in each of the two arms 4b, in which each of the two lens holding frame guide poles 3 as described above is closely fit.

The fitting between the two sets of the lens holding frame guide poles 3 and the through holes 4c may support and guide in precision the lens holding frame 4 while the lens holding frame 4 is rectilinearly displaced along the optical axis O.

Numeral 5 denotes a pair of biasing springs for uniform pressure contact of the rear end face 4a of the lens holding frame 4 with the three face cam portions 2b of the lens feeding member 2. Each of the biasing springs is a coil spring wound around the outer surface of the lens holding frame guide pole 3, which is disposed between the flange 3a of the lens holding frame guide pole 3 and the arm 4b of the lens holding frame 4.

Numeral 6 designates a basic reciprocating member for focusing the photo-taking lens L and for opening and closing the aperture and shutter blades 25, 26 as described below. The basic reciprocating member 6 is arranged on the lens barrel fixing portion 1 in such a fitting condition therewith that the basic reciprocating member can rotate about the optical axis O in the forward direction (clockwise) and in the backward direction (counterclockwise) with reference to a home position, (as will be referred to as "HP" and which corresponds to the "control reference position" as set forth in the appended claims) in the outer periphery portion of the lens feeding member 2.

There are formed on the outer periphery portion of the basic reciprocating member 6 a partial gear portion 61 formed in an angle range for example of about 120 degrees, a pressing protrusion 62 radially projecting out from the outer periphery and bent to project in the direction of the field of view from the projected position as shown in FIG. 2, and an HP signal generating portion 62 of protrusion structure formed at the tip of the pressing protrusion 62.

In this case, the partial gear portion 61 is arranged to mesh with a small diameter gear portion 36a of a reduction gear 36 as will be described later. A side end face of the pressing protrusion 62 in the forward direction is formed as a pressing engagement plane 62a, which can press a moved end plane 9b of a ratchet base plate 9 as described below when the basic reciprocating member 6 is rotated in the forward direction.

The HP signal generating portion 63, in the embodiment as shown, is constituted as a signal generating portion having a circular wall portion rotating on a circular trace about the optical axis O. When the circular wall portion is located on an optical path for detection of a photo interrupter 31 as described below, the circular wall portion interrupts a light beam for detection 33 of the photo interrupter 31. In contrast, when the circular wall portion is away from the optical path for detection of the photo interrupter 31, it permits the light beam for detection 33 of the photo interrupter 31 to freely pass through the optical path without interruption.

In such an arrangement, the side end face 63a (as will be referred to as "CCW side end face") of the circular wall portion directed counterclockwise corresponds to the predetermined proximate position on the exposure side as set forth in the appended claims, while the side end face 63b (as will be referred to as "CW side end face") of the circular wall portion directed clockwise to the predetermined proximate position on the focusing side as set forth in the appended claims.

In the embodiment as shown, a width of the HP signal generating portion 63 is defined as an angular distance of the circular wall portion ranging between the CCW side end face 63a and the CW side end face 63b (that is, a rotation angle conversion width of the basic reciprocating member 6), and the value thereof is determined to be plural pulses which are a combination of two kinds of drive pulses PM0, PM2 applied to a pulse motor 34 as described below. The drive pulses will be hereinafter called as "combination pulses".

Specifically, the width of the HP signal generating portion 63 is set to be a rotation angle conversion width of the basic reciprocating member 6 corresponding to for example thirteen pulses of the combination pulses (including one pulse for HP).

Incidentally, the HP of the basic reciprocating member 6 in designing is set for example at the central point of the width of the HP signal generating portion 63 in the present embodiment. In detail, each width between the HP and the CCW side end face 63a of the HP signal generating portion 63 and between the HP and the CW side end face 63b is set to a rotation angle conversion width corresponding to six combination pulses. Therefore, the HP of the basic reciprocating member 6 may be defined at a position to which the basic reciprocating member 6 rotates inward by six pulses of respective combination pulses from the CCW side end face 63a and from the CW side end face 63b of the HP signal generating portion 63.

A reason for such setting is as follows.

It is usual in a pulse driven camera, which carries out the setting of the object distance and the opening and closing of the shutter blades with the number of drive pulses applied to the pulse motor, that the number of drive pulses applied for motion of a certain mechanical moving member is started calculating from a certain reference position.

If a camera is produced as designed or intended, the mechanical moving portion may be returned to the certain reference position as defined by applying the same pulses in the backward direction as the applied number of pulses for moving the mechanical moving member up to the position corresponding to the predetermined number of pulses.

If the camera is arranged to set the certain reference position for example by using photoelectric detection means, it is possible that a relative position between the mechanical moving member and the photoelectric detection means is varied due to vibrations during shipping and aged deterioration. If it occurs, the mechanical moving member cannot return to the certain reference position as designed upon application of the designed number of drive pulses to the pulse motor.

It is thus preferable in designing the pulse driven camera of such a type that the mechanical moving member be assured to return to the reference position as designed.

Accordingly, the mechanical moving member is always returned to the reference position (corresponding to the HP in the embodiment as shown) as designed in the present embodiment by making use of an output signal H generated by the photo interrupter 31 when the CCW side end face 63a or the CW side end face 63b of the HP signal generating portion 63 interrupts the light beam for detection 33 of the photo interrupter 31, and further use of an output signal L generated by the photo interrupter 31 in the state that the CCW side end face 63a and the CW side end face 63b of the HP signal generating portion 63 permit the light beam for detection 33 of the photo interrupter 31 to pass without interruption.

In more details, the designing HP of the basic reciprocating member 6 is defined at a substantially middle position in width of the HP signal generating portion 63, the pulse phase of the HP thus defined is preliminarily stored in memory means (for example as a phase of "HH"), a first phase of "HH" is detected which appears after the output signal from the photo interrupter 31 is changed from L to H, and the pulse motor 31 is quickly stopped at the next "HH" phase position (for example at a position of four pulses in the embodiment as shown) appearing after the first "HH" so as to stop the basic reciprocating member 6 at the corresponding position.

In this arrangement, since the stop position of the basic reciprocating member 6 is always in the same "HH" phase as the phase stored in the above memory means, the second "HH" phase position may be defined as the HP in control of the basic reciprocating member 6 in the embodiment as shown, and angular positions apart for example by six pulses (specifically five to seven pulses applicable) from the H in the forward direction and in the backward direction are defined as predetermined proximate positions to the HP. Further, the HP of the basic reciprocating member 6 is set at the position apart by six pulses from the CCW side end face 63a and from the CW side end face 63b of the HP signal generating portion 63.

As described, the HP of the basic reciprocating member 6 may be set within the angular range corresponding to five to seven pulses from the CCW side end face 63a and from the CW side end face 63b of the HP signal generating portion 63. Thus, as for the relation among the HP, the CCW side end face 63a, and the CW side end face 63b of the HP signal generating portion 63, the HP need not necessarily be set at the center position of the HP signal generating portion 63.

The structure of the HP signal generating portion 63 may be modified in various manners depending upon the structure of the photo interrupter 31 as the photoelectric detection means and upon the way of processing the output signal thereof. For example, the HP signal generating portion 63 may be formed as a circular space portion and the surroundings thereof may be arranged as a light beam interrupting portion.

In such an arrangement, the light beam for detection 33 from the photo interrupter 31 passes through the space portion when the basic reciprocating member 6 is located at the predetermined proximate position, while the light beam for detection 33 is interrupted by the surrounding portion when the basic reciprocating member 6 is located in the surrounding portion. The output signal from the photo interrupter 31 is to be reversed from that in the embodiment as shown accordingly.

The forward and backward rotation operation of the basic reciprocating member 6 and the method for judging whether the basic reciprocating member 6 is located at the HP will be detailed later with a specific width of the HP signal generating portion 63.

Reference numeral 7 denotes a first engaging pin planted or formed in a portion near the outer periphery of the basic reciprocating member 6, which is arranged to engage with a slant flank 16a and a release moved portion 16b of a reset member 16 as described later when the basic reciprocating member 6 is rotated in the forward direction or in the backward direction.

The tip of the first engaging pin 7 is formed as a press inclined surface 7a which may slide-contact in an engageable relation with the slant flank 16a of the reset member 16 a shown in FIG. 3.

Numeral 8 designates a second engaging pin planted in a portion near the outer periphery of the basic reciprocating member 6 similarly as the first engaging pin 7, which may engage with a projecting arm 20a of a shutter blade opening and closing lever 20 a will be described later when the basic reciprocating member 6 is rotated from the HP in the backward direction.

Numeral 9 denotes a ratchet base plate disposed rotatable back and forth about the optical axis O, which is arranged to be connected to the lens feeding member 2 in such a state that the ratchet base plate 9 is adjustable in position relative to the lens feeding member 2 with an elliptic hole 9e formed therein and a fixing screw 10.

Concerning the connection between the ratchet base plate 9 and the lens feeding member 2, the ratchet base plate 9 is first rotated left an right relative to the lens feeding member 2 within a range of the elliptic hole 9e to adjust the relative position between them 9 and 2, and after that the fixing screw 10 is fastened to completely secure the members 9, 2. The two members of the lens feeding member 2 and the ratchet base plate 9 constitute the "distance setting member" as set forth in the appended claims.

In addition to the above-described elliptic hole 9e, there are formed on the outer periphery of the ratchet base plate 9 a partial gear portion 9a meshing with a biased gear 11, a moved end plane 9b pressed by the press connection plane 62a of the basic reciprocating member 6 in the forward direction (clockwise), and a ratchet teeth 9c engaged with a pawl 14a of a ratchet pawl member 14 as described below.

There are formed in the ratchet teeth 9c thirty one focusing step engaging teeth $9c_1$ to $9c_{31}$ for the respective focusing steps $L_1$ to $L_{31}$ of the photo-taking lens L and an initial position stopper 9d for defining the initial position of the ratchet base plate 9, as can prevent the ratchet base plate 9 from rotating in the backward direction (counterclockwise). Lengths of the respective focusing step engaging teeth $9c_1$ to $9c_{31}$ in the rotation direction (lengths on the circular periphery) and the structure of the initial position stopper 9d will be detailed later.

Numeral 11 represents a biased gear meshing with the partial gear portion 9a of the ratchet base plate 9, which is supported rotatable on a rotation support shaft 12 planted in the lens barrel fixing portion 1. The biased gear 11 biases the biasing spring 13 upon the focusing operation, but is biased by the biasing spring 13 to rotate clockwise in the return operation to follow the shutter closing operation. As a result, the biased gear 11 functions to rotate the ratchet base plate 9 by the biasing force of the biasing spring 13 from the in-focus position to the home position.

Numeral 14 designates a ratchet pawl member supported rotatable on the rotation support shaft 15 planted in the lens barrel fixing portion 1, which is arranged to have a pawl portion 14a capable of engaging detachably with either of the focusing step engagement teeth $9c_1$ to $9c_{31}$ of the ratchet teeth 9c of the ratchet base plate 9 as also shown in FIG. 3.

The ratchet pawl member 14 stops the ratchet base plate 9 at an in-focus position at that time when the ratchet base plate 9 is rotated from the initial position in the forward direction (clockwise) in focusing. Further, the ratchet pawl member 14 may release the stop of the ratchet base plate 9 by the operation of the first engaging pin 7 and the reset member 16 when the basic reciprocating member 6 is rotated in the forward direction (clockwise) after opening and closing aperture and shutter blades 25, 26 as described later.

Numeral 16 denotes a reset member formed at the tip portion of an elastic connection plate 17 by the insert molding. The elastic connection plate 17 is connected to the upper surface of the ratchet pawl member 14 by fusion bonding at two fusion-bonding portions 18 at the other end, whereby the three members of the ratchet pawl member 14, the reset member 16, and the elastic connection plate 17 become integral with each other like a single member.

Formed on the lower surface of the reset member 16 are the slant flank 16a and the release moved portion 16b as shown in FIG. 3. The slant flank 16a is shaped or structured to function to displace the reset member 16 against the elasticity of the elastic connection plate 17 by being pushed by the press inclined surface 7a of the first engaging pin 7 when the first engaging pin 7 is rotated counterclockwise from the position of FIG. 1.

The release moved portion 16b is shaped or structured to be pressed in the radial direction by the first engaging pin 7 when the first engaging pin 7 is rotated clockwise for return after it is once rotated counterclockwise from the position as shown in FIG. 1.

There will be described, in detail in sections of specific drive control method and operations, the engagement relation between the ratchet pawl member 14 and the focusing step engagement teeth $9c_1$ to $9c_{31}$ of the ratchet teeth 9c of the ratchet base plate 9, and the relative positional relation between the reset member 16 and the first engaging pin 7.

Reference numeral 19 designates a biasing spring bridging between the incorporated ratchet pawl member 14 and reset member 16, and the stationary portion, which is arranged to bias the incorporated members 14, 16 clockwise (in the direction in which the pawl 14a of the ratchet pawl member 14 is urged to press-contact with the ratchet teeth 9c) about the rotation support shaft 15.

Numeral 20 denotes a shutter blade opening and closing lever having a protection arm 20a at the central portion thereof, which is arranged to be supported rotatable about the rotation support shaft 21 planted in the lens barrel fixing portion 1. A non-operating position of the shutter blade opening and closing lever 20 is defined by a stopper 23. Numeral 22 represents a proper biasing spring for biasing to rotate the shutter blade opening and closing lever 20 counterclockwise.

Figure 4:
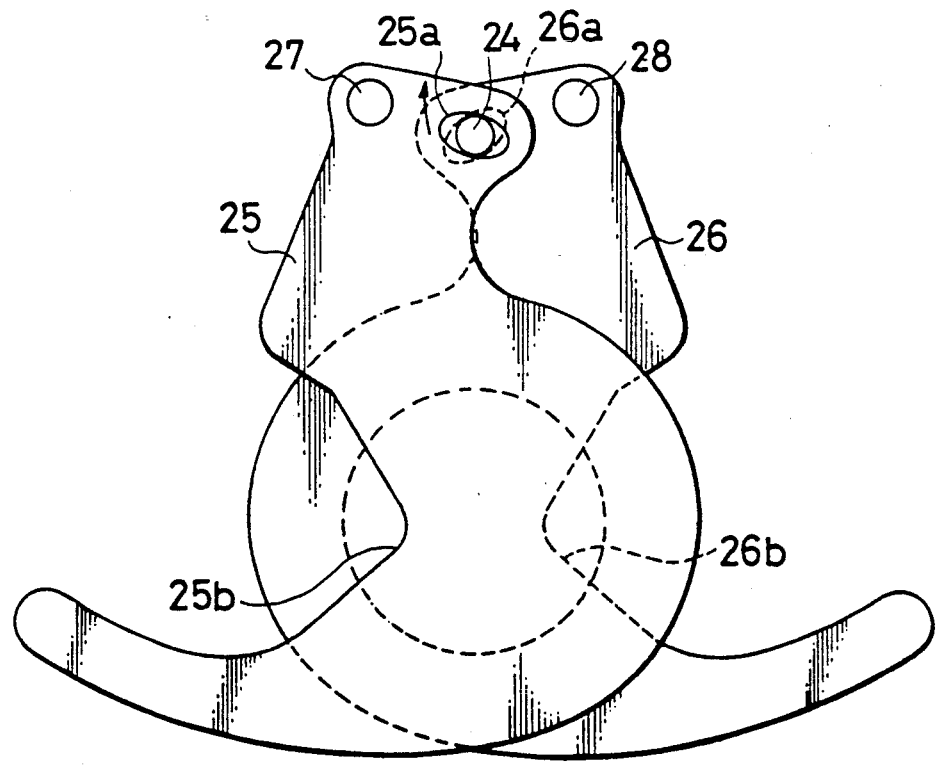
FIG. 4 is an elevational view to show an enlarged structure of shutter blades also serving as an aperture used in the lens barrel as shown in FIG. 1.

Numeral 24 designates an aperture drive pin for opening and closing the aperture and shutter blades 25, 26 as detailed below, which is planted in one end portion of the shutter blade opening and closing lever 20. The tip portion of the aperture drive pin 24 is inserted into and passes through an unrepresented through hole of the lens barrel fixing portion 1, and, as shown in FIG. 4, is closely fit into cam holes 25a, 26a of the paired aperture and shutter blades 25 and 26 disposed in the space behind the lens barrel fixing portion 1.

The pair of aperture and shutter blades 25, 26 (as will be referred to as "shutter blades") constituting the aperture and shutter means of a type of two blades are supported rotatable on two rotation support shafts 27 and 28, respectively. A part of the paired shutter blades 25, 26 are superimposed facing each other in the elevation of FIG. 4 in the space behind the lens barrel fixing portion 1.

A pair of cam holes 25a and 26a are formed in the respective shutter blades 25, 26 as intersecting with each other. The aperture drive pin 24 as described is fit into the intersection between the cam holes 25a and 26a.

The shutter blades 25, 26 are located in the usual state at the fully closed position where the aperture edges 25b, 26b thereof are overlapped with the opposing shutter blades 26 or 25, so that they may completely close the final photographic beam passing hole 29a of a back base plate 29 as described later. The shutter blades 25, 26 are rotated in exposure operation in the direction to leave each other (in opposite directions) in accordance with a movement amount of the aperture drive pin 24, so that the aperture edges 25b, 26b may form a stop aperture of a certain size.

Upon exposure, the shutter blades 25, 26 are first opened from the fully closed position to the exposure start reference position (a position immediately before reaching a pin hole state, as will be referred to as "trigger point") based on a command of a total control section CPU as described later, and, after that, are opened to a position of correct stop aperture corresponding to a correct exposure amount at that time. Then, the shutter blades 25, 26 return to the trigger point, and further to the fully closed state.

A shutter exposure time t defined by the shutter blades 25, 26 is set as follows. In the embodiment as shown, it is set that $t=t_0$ at the time when the shutter blades 25, 26 are located at the trigger point, that $t=t_{AE}$ (in case of the automatic exposure control) or $t=t_{FM}$ (in case of the flashmatic control) at the time when the shutter blades 25, 26 are opened to an aperture corresponding to a correct exposure amount at that time (as will be referred to as "correct stop aperture value"), and that $t=t$ at the end point of exposure time when the shutter blades 25, 26 has returned to the trigger point from the aperture position.

In case of the aperture and shutter means of two blade type as in the embodiment as shown, a shutter exposure time t for automatic exposure control is a time from $t=t_0$ via $t=t_{AE}$ to $t=t$, and a shutter exposure time t for flashmatic control is a time from $t=t_0$ via $t=t_{FM}$ to $t=t$.

Each shutter exposure time t is arranged to be controlled based on a time from the time ($t=t_0$) when the shutter blades 25, 26 are located at the trigger point to a time ($t=t_{AE}$ or $t=t_{FM}$) when the shutter blades 25, 26 are opened to the position of correct stop aperture.

In the following description, the time in which the shutter blades 25, 26 are opened from the trigger point to the position of correct stop aperture will be referred to as "shutter blade opening time".

Numeral 29 denotes a back base plate attached to the lens barrel fixing portion 1 to cover the space behind the lens barrel fixing portion 1. A final photographic beam passing hole 29a is formed in a region of the back base plate 29 on the optical axis O.

Numeral 30 is a stop ring member of the photo-taking lens L, which is arranged to be screwed into the front end of the lens holding frame 4. Numeral 31 denotes a photoelectric detection device for setting the HP of the basic reciprocating member 6, which is provided on the stationary portion of camera for example as a photo interrupter or as a photo reflector having a proper structure.

For example in the embodiment as shown, the photoelectric detection device is a photo interrupter 31 having the following structure while disposed along the rotation trace of the HP signal generating portion 63 of the basic reciprocating member 6.

Figure 6:
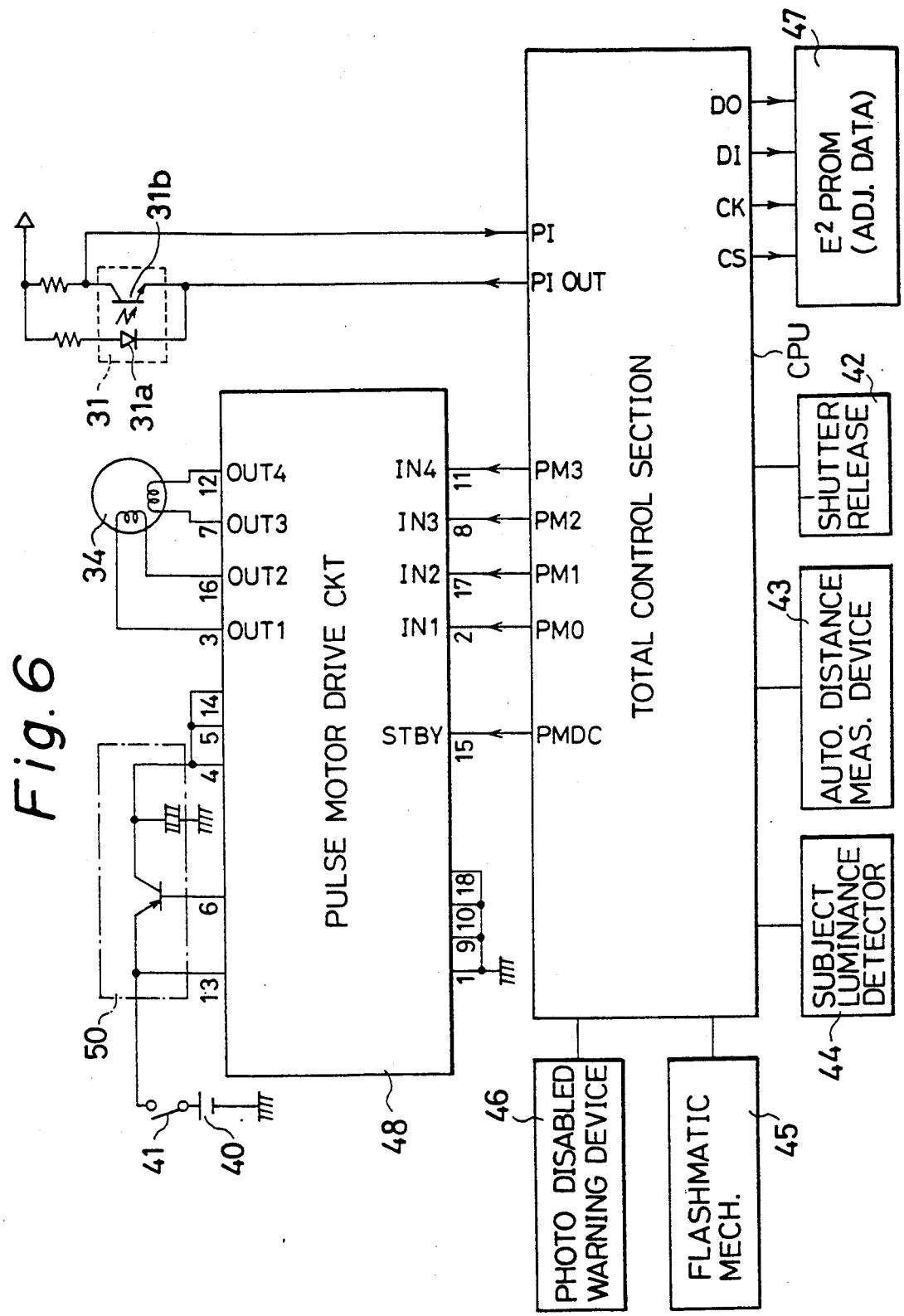
FIG. 6 is a circuit block diagram to illustrate mainly a supply and reception relation between a total control section and a pulse motor drive circuit in FIG. 5.

The photo interrupter 31 is structured as shown in FIG. 6 as a light projection-reception unit comprised of an infrared emitting device 31a and a photo receptor 31b disposed on a straight line to cross a recess passage 32 as shown in FIG. 2.

The recess passage 32 is provided in parallel with the optical axis O in the outside space of the lens holding frame 4 in such a condition that the HP signal generating portion 63 can pass through the recess passage 32 when the basic reciprocating member 6 rotates clockwise and counterclockwise about the optical axis O. The infrared emitting device 31a and the photo receptor 31b are arranged such that the light beam for detection 33 from the infrared emitting device 31a is emitted radially in FIG. 1 and vertically in FIG. 2 in the recess passage 32.

In case that the photoelectric detection device is arranged as a photo reflector, the HP signal generating portion 63 must be shaped or structured to reflect the light beam for detection 33 and the optical path of the light beam for detection 33 must be arranged as a reflection optical path. In the following explanation, the optical path of the light beam for detection 33 is called as a detection optical path including the reflection optical path.

In the embodiment as shown, a signal output from the photo interrupter 31 as the photoelectric detection means to the total control section CPU is preliminarily set as follows.

(a) The photo interrupter 31 provides an H signal as an output signal when the circular wall portion of the HP signal generating portion 63 (a portion between the CCW side end face 63a and the CW side end face 63b) is located on the detection optical path of the photo interrupter 31 (when the light beam for detection 33 is interrupted) while the basic reciprocating member 6 is rotated from the HP in the forward direction or in the backward direction.

(b) The output signal from the photo interrupter 31 is changed from the H signal to an L signal when either of the CCW side end face 63a and the CW side end face 63b of the H signal generating portion 63 is away from the detection optical path of the photo interrupter 31 (when the light beam for detection 33 becomes free to pass therethrough) while the basic reciprocating member 6 is rotated from the HP in the forward direction or in the backward direction.

(c) The output signal of the photo interrupter 31 is changed from the L signal to the H signal when either of the CCW side end face 63a and the CW side end face 63b of the HP signal generating portion 63 is in the detection optical path of the photo interrupter 31 (when the light beam for detection 33 is again interrupted) while the basic reciprocating member 6 is returning from the in-focus position or from the shutter opening position to the HP.

In summary, the light beam for detection 33 of the photo interrupter 31 is arranged to be interrupted while the basic reciprocating member 6 is located within an angular range between an angle position where one of the side end faces (for example the CCW side end face 63a) of the HP signal generating portion 63 is located on the detection optical path of the photo interrupter 31 and an angle position where the other side end face (for example the CW side end face 63b) is located on the detection optical path of the photo interrupter 31.

In other words, the photo interrupter 31 always outputs the H signal whenever the basic reciprocating member 6 is located at a position within the angular range.

The above arrangement, however, fails to set the HP of the basic reciprocating member 6 in precision, which should be desirably set at a "point". Thus, the embodiment as shown has a special arrangement to set the HP of the basic reciprocating member 6 accurately and securely in the relative relation between the side end faces 63a and 63b of the HP signal generating portion 63 and the detection optical path of the photo interrupter 31. The details are as follows.

(1) The HP is defined at a position of a predetermined number of pulses (six pulses in the present embodiment) after the CCW side end plane 63a of the HP signal generating portion 63 starts interrupting the detection optical path of the photo interrupter 31 while the basic reciprocating member 6 is returning from the in-focus position toward the HP. A combination phase at that time (for example HH) is stored in a memory device in adjustment during the assembling of camera. The backward rotation angle of the basic reciprocating member 6 is referred to a "a backward HP setting rotation angle".

In actual use of camera, while the basic reciprocating member 6 is returning from the in-focus position toward the HP and when the output signal of the photo interrupter 31 is changed from the L signal to the H signal, the pulse motor 34 continues further rotating in the same direction from the change time or position, and the pulse motor 34 is quickly stopped rotating when the supply phase to the pulse motor 34 becomes a preset phase (in the present embodiment when the supply phase takes twice the preset phase after the signal change), whereby the basic reciprocating member 6 is stopped at the position corresponding to the stop position of the pulse motor 34.

In case of a camera structured to open and close the shutter blades 25, 26 in a successive manner, the basic reciprocating member 6 is not stopped at this position, but this position is set as a reference position for shutter blade opening and closing operation, from which the shutter blade opening and closing operation is started.

(2) The HP is defined at a position of a predetermined number of pulses (six pulses in the present embodiment) after the CW side end face 63b of the HP signal generating portion 63 starts interrupting the detection optical path of the photo interrupter 31 while the basic reciprocating member 6 is returning from the shutter opening position to the HP. A combination phase at that time (for example HH) is stored in a memory means ($E^2$-PROM47) in adjustment upon assembling of camera. The forward rotation angle of the basic reciprocating member 6 during the rotation from the optical path interrupting position to the HP will be referred to as "a forward HP setting rotation angle".

In use of camera, while the basic reciprocating member 6 is returning from the shutter opening position to the HP and when the output signal of the photo interrupter 31 is changed from L signal to the H signal, the pulse motor 34 is further rotated from the change time or position, and the pulse motor 34 is quickly stopped rotating when the supply phase to the pulse motor 34 becomes a preset phase (in the present embodiment when the supply phase takes twice the preset phase after the signal change), whereby the basic reciprocating member 6 is stopped at the position corresponding to the stop position of the pulse motor 34.

In the embodiment as shown, the stop position of the basic reciprocating member 6 attained by the drive control in the above (1) and (2) is defined as the HP thereof, and the basic reciprocating member 6 is correctly returned to the HP with the signal at the time or position where the output signal of the photo interrupter 31 is changed from the L signal to the H signal.

As so arranged, the HP setting of the basic reciprocating member 6 is carried out before start or after end of photo-taking operation, which is the most important necessity in order to maintain the precision as the pulse controlled camera sufficiently high. The specific setting method and arrangement will be detailed below.

Numeral 34 denotes a pulse motor for rotating the basic reciprocating member 6 in the forward direction and in the backward direction. The pulse motor 34 is arranged, for example as shown in FIGS. 5(i) and (ii) to be rotation-controlled in the forward direction and in the backward direction by the two-phase-on drive with combination pulses from the total control section CPU as described later.

Numeral 35 denotes an output gear which is fixedly attached to an output shaft 34a of the pulse motor 34.

Numeral 36 designates a reduction gear composed of a large diameter gear portion 36b and a small diameter gear portion 36a, which is supported rotatable on a rotation support shaft 37 planted in the lens barrel fixing portion 1. The large diameter gear portion 36b meshes with the output gear 35 of the pulse motor 34 and the small diameter gear portion 36a meshes with the partial gear portion 61 of the basic reciprocating member 6.

Figure 5:
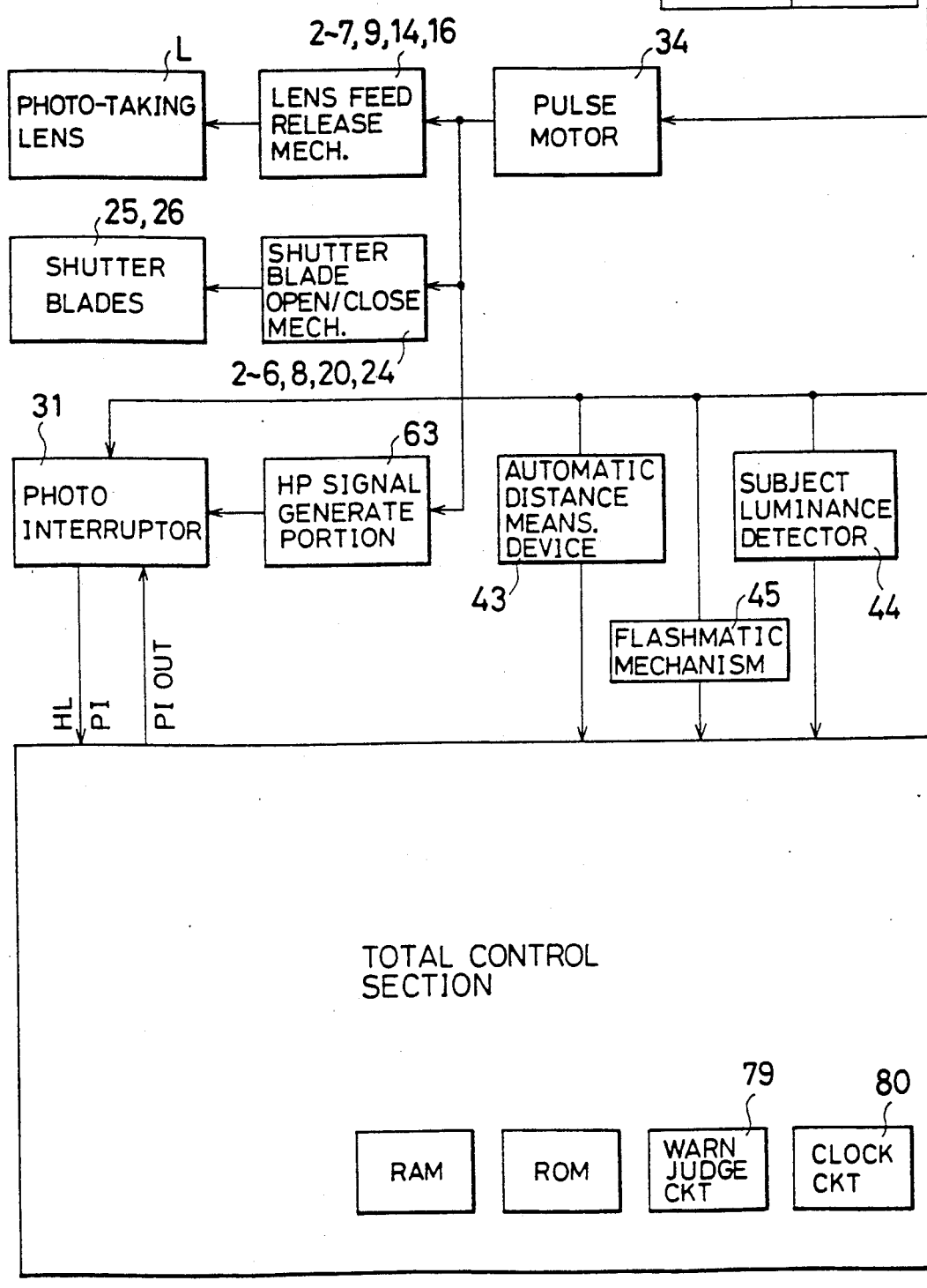
Figure 5:
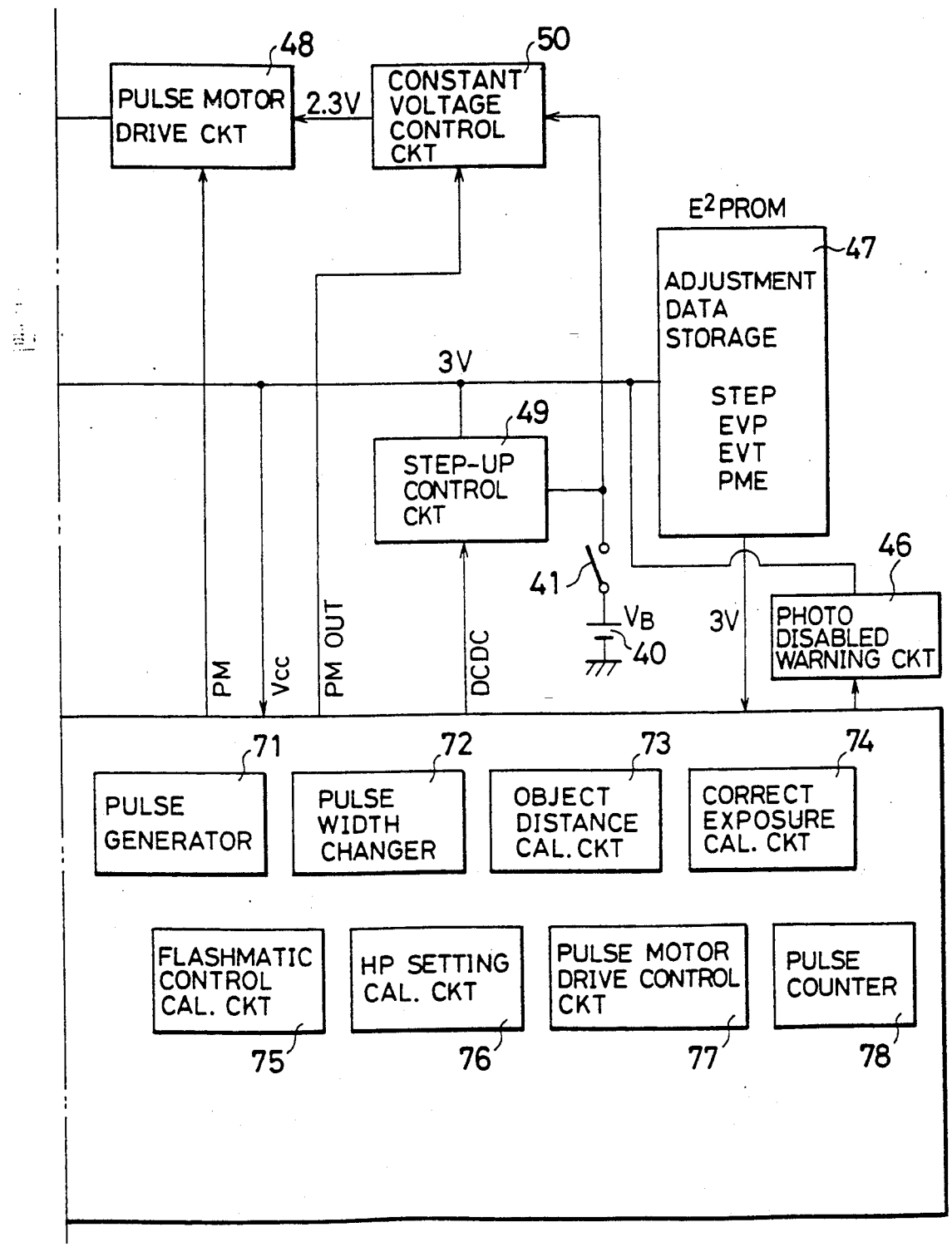

FIGS. 5(i) ,(ii) is a control block diagram to show a structure of electric circuits related to the entire control system of the pulse-controlled camera as shown, and FIG. 6 is a circuit block diagram to illustrate mainly the signal supply and reception relation between the total control section and the pulse motor drive circuit in FIGS. 5(i),(ii). In FIGS. 5(i),(ii) and 6, reference numeral 40 designates an operation power source for example to generate a DC voltage of 3V, which is turned on or off by a power switch 41.

The power switch 41 is arranged as a switch structured also to serve as a start switch of the pulse-controlled camera as shown. When the power switch 41 is turned on, the total control section CPU is electrically reset and a step-up control element 49 and a constant voltage control element 50 are actuated to apply a predetermined voltage to each element including the total control section CPU and the pulse motor drive circuit 48.

Numeral 42 is a shutter release member provided at a proper position in the camera, which is arranged as an operational member allowing a two step stroke operation. The shutter release member 42 outputs a signal for example for starting the photometry operation and the distance measurement operation with a first step of the stroke operation, and a signal for starting the feeding operation of the photo-taking lens L and the exposure operation with a second step of the stroke operation to follow the first step, to the total control section CPU as described later.

In place of the electric reset of the total control section CPU with the on operation of the power switch 41, the total control section CPU may be electrically reset with the first step of the stroke operation of the shutter release member 42.

Numeral 43 denotes an automatic distance measuring device (as will be referred to as "AF device") disposed at a proper position in the camera, which is arranged as a triangulation-type automatic distance measuring apparatus having an infrared ray projecting section (not shown) comprising an infrared emitting source such as an infrared LED and a projection optical system disposed before the infrared emitting source, and a distance measurement light receiving portion (not shown) comprising a one-dimensional semiconductor position detection element (PSD: Position Sensitive Detector) and a light receiving optical system disposed before the detector.

An infrared beam of predetermined wavelength is projected toward a subject from the infrared ray projecting section, and the infrared ray reflected by the subject is imaged as a light spot on a reception plane of the one-dimensional semiconductor position detection element of the distance measurement light receiving section, whereby a distance from a reference point to the imaged light spot is detected and the distance data is output as a subject distance corresponding value (analog value) to the total control section CPU.

Numeral 44 is a subject luminance detection device provided at a proper position in the camera, which has a photometry device (not shown) comprised for example of a bisectional CdS device to permit the detection in the rear light condition. The subject luminance detection device outputs its detection value to the total control section CPU as subject luminance information.

Numeral 45 denotes a flashmatic mechanism provided only for the camera arranged to execute a flash light photography, which determines a correct stop aperture of the shutter blades 25, 26 based on an object distance at that time with a guide number of a flash light emitting device (not shown) and which output the information about the correct stop aperture to the total control section CPU.

The flashmatic mechanism 45 and the subject luminance detection device 44 are intended to be included in the correct exposure calculating means as set forth in the appended claims. The significance of this is that the present invention involves a camera provided with the both subject luminance detecting device 44 and the flashmatic mechanism 45, and a camera provided with only one of the elements 44 and 45.

Numeral 46 denotes a photograph disabled warning device connected to the total control section CPU, which is arranged to provide a photographer with a warning in visual or audible means to notify the abnormal event, based on a command from the total control section CPU for example, when the basic reciprocating member 6 is not correctly returned to the HP or when there is any abnormal event in the camera. The visible or audible warning may be a display warning using the flashing of LED or a sound warning using sounds for example. In addition to the warning, the photograph disabled warning device 46 may be arranged as means also serving as a function stop device which disables the shutter release operation and/or the exposure operation. The embodiment as shown is so arranged.

It is usual as described above that production errors and assembling errors are made in machining and in assembling when the mechanical means are produced for the feeding operation of the lens L and for the opening and closing operation of the aperture and shutter blades. Thus, in order to make the camera operate in actual, it must be controlled in a state free of influence of the mechanical errors.

In the embodiment as shown, considering a case that there are errors in machining and in assembling in the mechanical means (for example the ratchet base plate 9) for feeding of the lens L, the designing position of the focusing step engagement tooth $9c_0$, which is the feeding reference position of the lens L, may be determined adjustable by the electric control method in which the combination pulse number applied to the pulse motor 34 is adjusted while the basic reciprocating member 6 is rotated from the HP clockwise (in the forward direction). Also, considering that there are errors in machining and in assembling in the mechanical means (for example the aperture and shutter blades 25, 26) for opening and closing the aperture and shutter blades, the trigger point (the position at $t=t_0$) of the shutter blades 25, 26, which is a reference for exposure time calculation, may be determined adjustable by the electric control method in which the combination pulse number applied to the pulse motor 34 is adjusted while the basic reciprocating member 6 is rotated from the HP counterclockwise (in the backward direction).

Further, the combination pulse number applied to the pulse motor 34 in the HP setting control of the basic reciprocating member 6 as described later is also set adjustable by using the electric control method to adjust the combination pulse number applied to the pulse motor 34, considering the mechanical errors.

The specific adjustment values will be explained in description of the operation. In the embodiment as shown, these values adjusted for each camera (adjustment values) are stored in a writable manner in a memory device 47 connected to the total control section CPU. The E²PROM is employed as the memory device 47.

Figure 7:
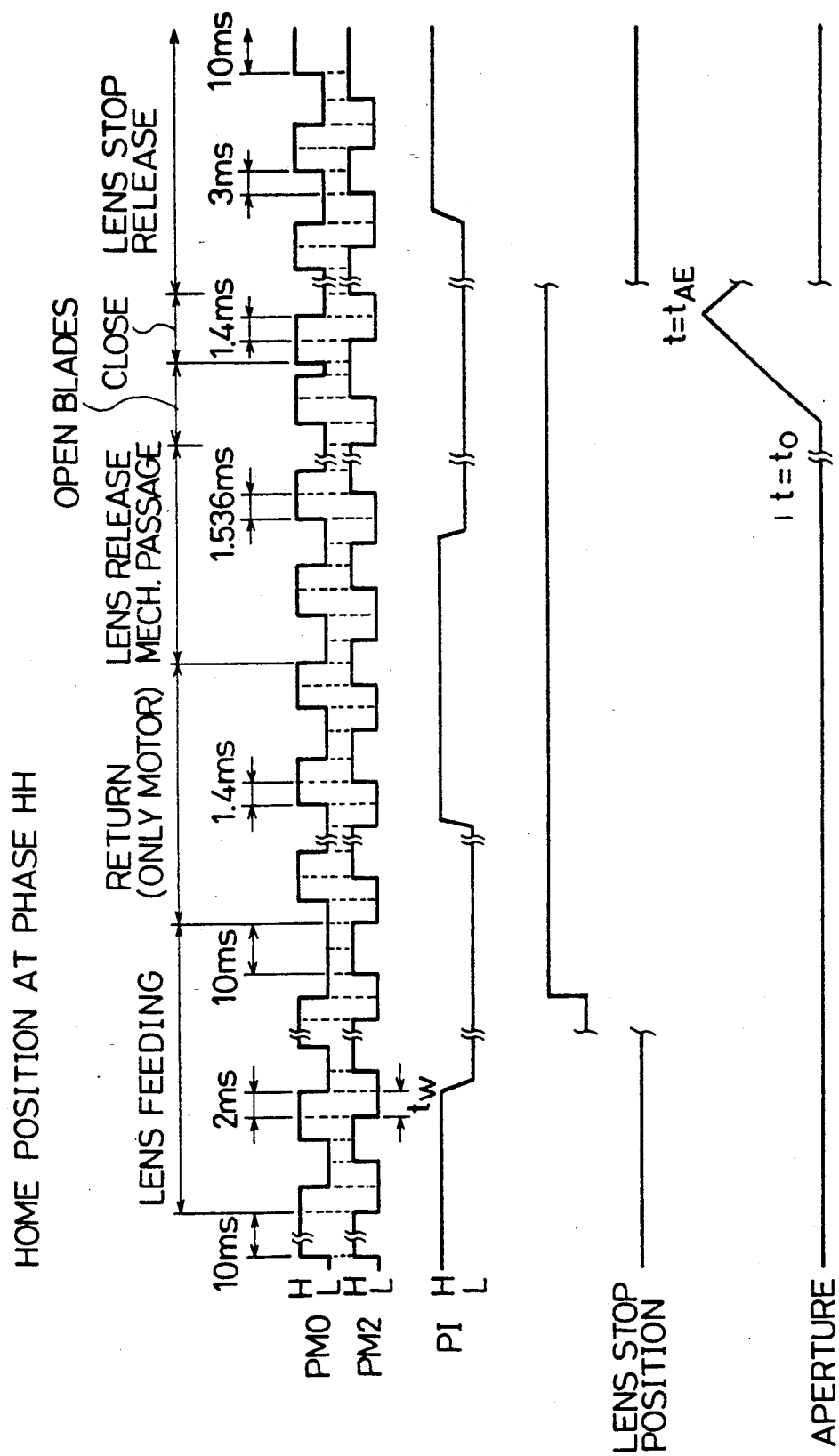
FIG. 7 is an overall timing chart to illustrate the entire operation and effect in the pulse-controlled camera as shown in FIG. 1.

The specific data will be detailed in the description of the drive control method. Numeral 48 denotes a pulse motor drive circuit for controlling the drive and the stop of the pulse motor 34. The pulse motor drive circuit 48 is arranged to drive-control the pulse motor 34 as follows. When the pulse motor drive circuit 48 receives drive pulses PM0 to PM3 of "0" or "1" from the pulse motor drive control circuit 77 in the total control section CPU through four input pins No. 2 (IN1), No. 17 (IN2), No. 8 (IN3), No. 11 (IN4), it converts the drive pulses PM0 to PM3 into combination pulses of two types or kinds selected from HH, HL, LH, and LL as shown in FIG. 7. The thus-converted combination pulses are output through four output pins No. 3 (OUT1), No. 16 (OUT2), No. 7 (OUT3), No. 12 (OUT4) to the pulse motor 34, whereby the pulse motor 34 is rotated in the forward direction and in the backward direction at a certain timing by a certain number and is stopped at a certain timing.

Figure 8:
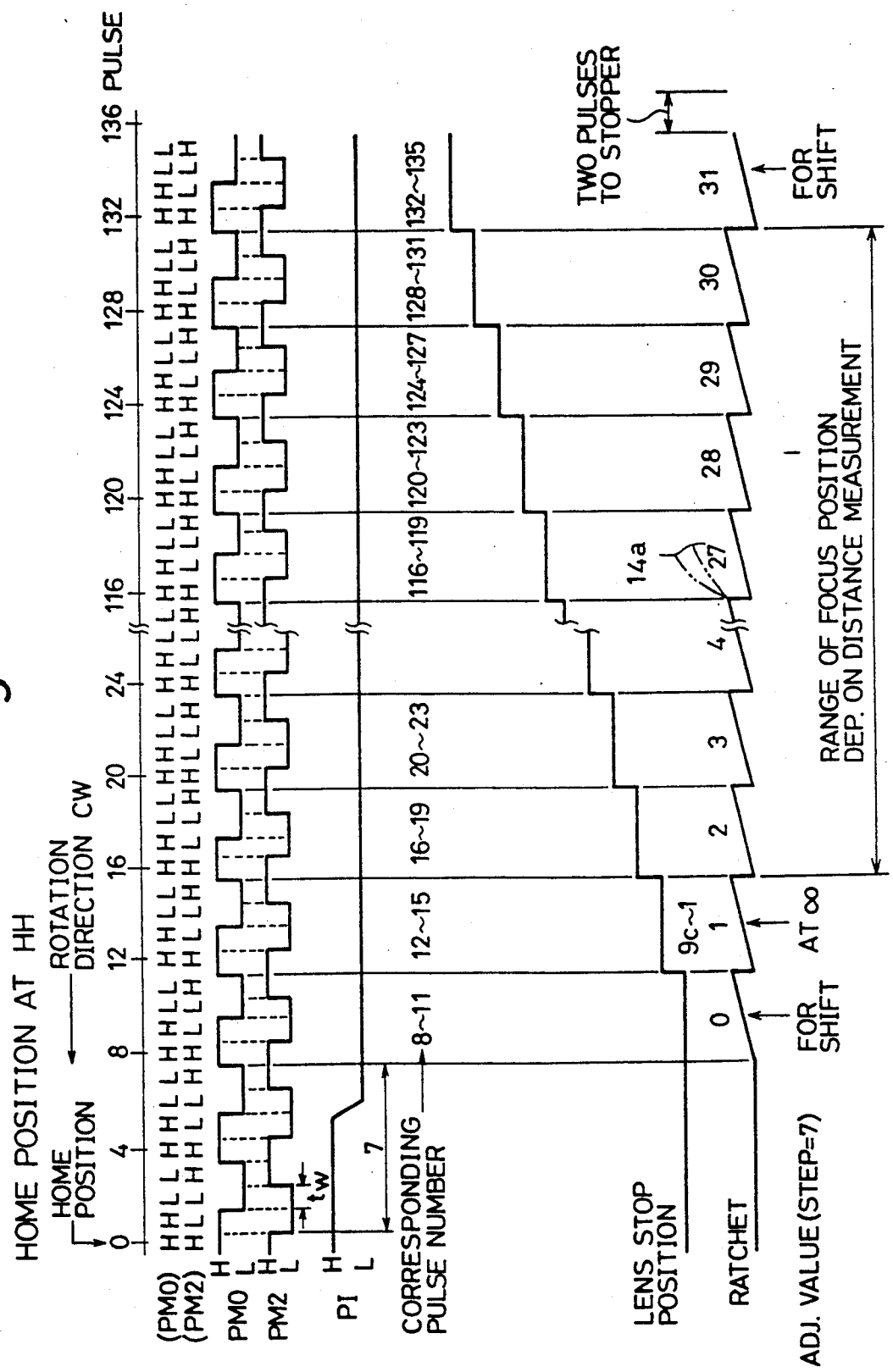
FIG. 8 is a partial timing chart to illustrate an operation of a photo-taking lens feeding in the pulse-controlled camera as shown in FIG. 1.

A notation employed here is that a signal of PM0 is first to be described in the combination pulse. In FIG. 7 to FIG. 9, the pulses PM1 and PM3 (not shown) are inverse in polarity of the pulses PM0 and PM2, respectively, (only when the current is supplied to the pulse motor 34).

Numeral 49 denotes a set-up control device for maintaining the normal voltage of 3 V for the circuits even when the voltage of the operation power source 40 decreases due to dissipation for example. Numeral 50 denotes a constant voltage control device for securing the operation voltage for example for the pulse motor drive circuit 48, which must be a constant voltage of 32. V.

The total control section CPU is arranged with a suitable microcomputer for executing the entire control of the pulse-controlled camera, in which there are provided various circuits and means including a pulse generating circuit 71, a pulse width changing device 72, an object distance calculating circuit 73, a correct exposure calculating circuit 74, a flashmatic control calculating circuit 75, an HP setting calculation circuit 76, a pulse motor drive control circuit 77, a pulse counter 78, and a photograph disabled warning judging circuit 79.

The pulse generating circuit 71 generates combination pulses set in time series in later-described (a)–(h) of a program storing device ROM. The pulse generating circuit 71 is structured as a circuit with a structure which is well known per se. The pulse width changing device 72 changes a width of the combination pulses (drive pulses) generated by the pulse generating circuit 71 for example into a pulse width as shown in the entire operation timing chart of FIG. 7.

The object distance calculating circuit 73 automatically calculates a distance to a subject (as will be also referred to as "object distance") based on an object distance corresponding value input into the AF device 43. The object distance calculating circuit 73 automatically determines a location (step number) of the focusing step $L_n$ of the photo-taking lens L, where the object distance can be attained, based on the thus-calculated value. Further, the object distance calculating circuit 73 calculates the first step forward rotation number of the pulse motor 34 necessary for rotation of the basic reciprocating member 6 (as well as the ratchet base plate 9) to the position of the determined focusing step $L_n$ and a combination pulse number necessary for obtaining the rotation number, and then temporarily stores the thus-calculated numbers in the total control section CPU.

The correct exposure calculating circuit 74 calculates a correct exposure amount (correct EV data) based on information about a subject luminance input from the subject luminance detection device 44 and information about ISO speed of a film used, input from a film speed detecting device (not shown). Further, the correct exposure calculating circuit 74 determines a correct stop aperture value of the shutter blades 25, 26 and a time in which the shutter blades 25, 26 open from the trigger point at the time $t=t_0$ to the correct stop aperture value at the time $t=t_{AE}$, based on the calculated correct exposure amount, and temporarily stores them in the total control section CPU.

The flashmatic control calculating circuit 75 is provided only for a camera arranged to execute flash light photography. The flashmatic control calculating circuit 75 determines a time in which the shutter blades 25, 26 open from the trigger point at the time $t=t_0$ to the correct stop aperture value at the time $t=t_{FM}$, based on the information about the correct stop aperture determined by the guide number input from the flashmatic mechanism 45, and temporarily stores it in the total control section CPU.

The HP setting calculating circuit 76 calculates the HP setting sequence of the basic reciprocating member 6 based on the stored data of (a)-(h) in the programming device as described later.

The pulse motor drive control circuit 77 applies to the pulse motor drive circuit 48 the combination pulses changed in pulse width by the pulse width changing device 72 in accordance with the pulse number set in time series in (a)-(h) in the program device and with the pulse number calculated by the respective calculating circuits 73 to 76.

The pulse counter 78 counts the number of combination pulses applied from the pulse motor drive control circuit 77 to the pulse motor drive circuit 48. The pulse counter 78 resets the count accumulated when a reset signal is applied from the program device.

The photograph disabled warning judging circuit 79 is a circuit for judging whether the operation of the camera is normal or not. For example if the basic reciprocating member 6 is not correctly returned to the HP, or, if there is any abnormal event in the camera, the photograph disabled warning judging circuit 79 detects the event to output the fact to the photograph disabled warning device 46.

Numeral 80 denotes a clock circuit (timer) for setting the aforementioned shutter blade opening time, which starts counting at the time $t=t_0$ when the shutter blades 25, 26 are located at the trigger point and which continues counting a time in which the shutter blades 25, 26 open from the trigger point to the position of correct stop aperture value ($t=t_{AE}$ or $t=t_{FM}$).

Further, the total control section CPU has the program device ROM and a temporary memory function, in which various programs necessary for executing the photo-taking sequence including the subsequences such as the HP setting sequence of the basic reciprocating member 6, the lens feeding sequence, the shutter blade opening and closing sequence, and the like.

In the embodiment as shown, the program device and the memory device are arranged to store the following fundamental data for example.

(a) In the present embodiment, the focusing step engagement teeth $9c_1$ to $9c_{31}$ set in thirty one steps have respective lengths of engagement teeth in the rotation direction (lengths on the circle), each of which is set to be the combination pulse number of four pulses. Further, the position of the first engagement tooth $9c_1$ is set at a position of twelfth pulse in the combination pulses calculated from the HP (which corresponds to the combination pulse number of eleven pulses from the HP). There is stored data in which an adjustment pulse number corresponding to the dispersion of feeding start reference position of the photo-taking lens L (the lens holding frame 4) is added to the number of twelve pulses.

(b) Upon focusing, in order to rotate the basic reciprocating member 6 (the distance setting member 9) by the maximum amount from the HP in the forward direction, the forward combination pulse number applied to the pulse motor 34 is set to 137 pulses including extra two pulses as shown in FIG. 8. The thus-set data is stored. The 137 pulses include six pulses which are a correction rotation angle in the forward direction of the basic reciprocating member 6 (the HP signal generating portion 63).

(c) To return the basic reciprocating member 6 from the position rotated in the above (b) to the HP, 137 pulses, which are same in number as the combination pulse number applied in (b) but inverted in directionality, are set as the combination pulse number applied to the pulse motor 34. The combination pulse number of 137 pulses with the backward directionality is thus stored.

(d) To achieve the rotation amount of the basic reciprocating member 6 from the HP necessary for setting the shutter blades 25, 26 at the exposure start reference position (the position at $t=t_0$), a combination pulse number of backward directionality applied to the pulse motor 34 is set for example as fifteen pulses as shown in FIG. 9 (though the pulse number would be dispersed depending upon the shutter, which is also the case in the following). The combination pulse number of fifteen pulses is stored.

In detail, the combination pulse number corresponding to the backward rotation amount of the basic reciprocating member 6 necessary for opening the shutter blades 25, 26 through the shutter blade opening and closing lever 20 from the fully closed position to the trigger point (the position at $t=t_0$) is set as general data, for example as fifteen pulses from the HP.

(e) To achieve the rotation amount of the basic reciprocating member 6 from the exposure start reference position necessary for opening the shutter blades 25, 26 from the exposure start reference position to the position of maximum stop aperture (at $t=t_{AE-max}$), the combination pulse number of backward directionality applied to the pulse motor 34 is set as ten pulses as shown in FIG. 9. The combination pulse number of ten pulses is store as data.

Accordingly in the embodiment as shown, the correct stop aperture (at $t=t_{AE}$ or at $t=t_{FM}$) is achieved by time control within the ten pulses not only in case of the automatic exposure control but also in case of the flashmatic control.

(f) To return the basic reciprocating member 6 from the position of the maximum stop aperture (at $t=t_{AE-max}$) of the shutter blades 25, 26, a combination pulse number of forward directionality applied to the pulse motor 32 is set as data of the same pulse number as a sum of fifteen pulses in (d) and ten pulses in (e). The combination pulse number is stored as data.

It is needless to mention that the pulse number includes six pulses for forward correction rotation angle of the basic reciprocating member 6 (the HP signal generating portion 63) as described above.

(g) In an actual exposure operation, when the shutter blades 25, 26 are opened by time control from the exposure start reference position to the position of correct stop aperture corresponding to the correct exposure amount calculated by the correct exposure calculating circuit 74, the pulse motor 34 is quickly stopped at that time and the pulse motor is rotated in the forward direction. The data for the quick stop and the forward rotation of the pulse motor 34 is stored.

Therefore, in the actual exposure operation, the combination pulse number applied to the pulse motor 34 for the backward rotation of the basic reciprocating member 6 from the HP results in a total pulse number of fifteen pulses in (d) with the pulse number applied while the shutter blades 25, 26 open from the exposure start reference position to the correct stop aperture position.

(h) In the actual exposure operation, to achieve the forward rotation amount for returning the basic reciprocating member 6 from the correct stop aperture position of the shutter blades 25, 26 to the HP, the combination pulse number applied to the pulse motor 34 is set as a sum pulse number of fifteen pulses with a combination pulse number of forward directionality having the same pulses as the combination pulse number of backward directionality applied to the pulse motor 34 while the shutter blades 25, 26 open from the exposure start reference position to the correct stop aperture position. The data of the sum pulse number is stored.

Each pulse width $t_W$ of the respective combination pulses as described in (a) to (h) may be set as an identical value. However, if desired, for example if the operation time of the entire sequence is desired to be shortened while maintaining the high precision related to the respective functions of camera, the width $t_W$ of the respective combination pulses may be modified into an arbitrary time (in the unit of ms), for example as shown in the entire operation timing chart of FIG. 7, to obtain a time suitable for the purpose.

The modification of pulse width is to be properly carried out in the process of designing the camera. In case of the modification of pulse width, the modification setting of pulse width in the entire operation timing chart of FIG. 7 and the value of pulse width after modification will be stored in the program device.

For example in feeding the photo-taking lens L (in the first forward rotation of the basic reciprocating member 6), it is necessary to select a pulse width enabling the high speed operation while assuring a time to execute the sure engagement operation of the pawl 14$a$ of the ratchet pawl member 14 with the respective focusing step engagement teeth $9c_1$ to $9c_{31}$ each being set in length of four pulses. There is no problem caused in respect of the precision during the second stage rotation of the basic reciprocating member 6, and therefore the pulse width may be made shorter than the pulse width during the lens feeding to increase the operation speed.

Since the shutter blades 25, 26 conduct the opening operation in the backward rotation of the basic reciprocating member 6 from the HP to the correct stop aperture position of the shutter blades 25, 26, the pulse width should be selected to assure the sufficient stop precision of the shutter blades 25, 26 while maintaining the high speed operation as described above.

While the shutter blades 25, 26 transfer from the correct stop aperture position to the closed position in the process of the forward rotation of the basic reciprocating member 6 from the position corresponding to the correct stop aperture, the pulse width is set of high speed to minimize a mechanical operation delay of the shutter blades 25, 26.

The operation for returning the photo-taking lens L from the in-focus position to the lens initial position may be carried out in parallel with the film feed operation requiring a relatively longer time. Additionally, the release operation of the pawl 14$a$ of the ratchet pawl member 14 must be carried out in a smooth manner, and therefore the pulse width in the forward rotation of the basic reciprocating member 6 from the position after completion of the exposure operation (the exposure start reference position) toward the HP is not to be especially shortened. A proper pulse width is to be set accordingly.

Incidentally, the calculation start position of the drive pulse number set by the calculation result of the object distance calculating circuit 73 (the object distance information of the automatic distance measuring device 43) may be set in an outside area of the predetermined proximate position on the focusing side as described (for example at a position where a predetermined phase is obtained after the photo interrupter 31 has changed the output from H to L), and the drive pulse number calculated from this calculation start position may replace the combination pulse number applied to the pulse motor in (b) as described above.

In a modification, the combination pulse number of backward directionality applied to the pulse motor 34 in the above (c) may be set as successive combination pulses without any specific application number of pulses, and when the basic reciprocating member 6 has reached the predetermined proximate position on the focusing side, the basic reciprocating member 6 may be positioned at the HP by making use of the HP setting operation of the photo interrupter 31.

Further, the combination pulse number of forward directionality applied to the pulse motor 34 in the above (f) and (h) may be set as successive combination pulses without any specific application number of pulses, and when the basic reciprocating member 6 has reached the predetermined proximate position on the exposure side, the basic reciprocating member 6 may be stopped at the HP by making use of the HP setting operation of the photo interrupter 31.

The specific drive control method of the camera in the embodiment as shown is as follows.

Control for Setting Basic Reciprocating Member 6 at HP

In the camera in the embodiment as shown, a reference condition to set the timing of the photo-taking sequence is that the basic reciprocating member 6 is located at the HP and that the distance setting member, the ratchet base plate 9, the lens feeding member 2 (as well as the lens holding frame 4), and the shutter blade opening and closing lever 20 are located at the respective initial positions.

In order to maintain the precision as the camera high, it is necessary that the basic reciprocating member 6 is always positioned at the HP at the start of the photo-taking operation or at the end of the photo-taking operation and that the position thereof is monitored.

Figure 10B:
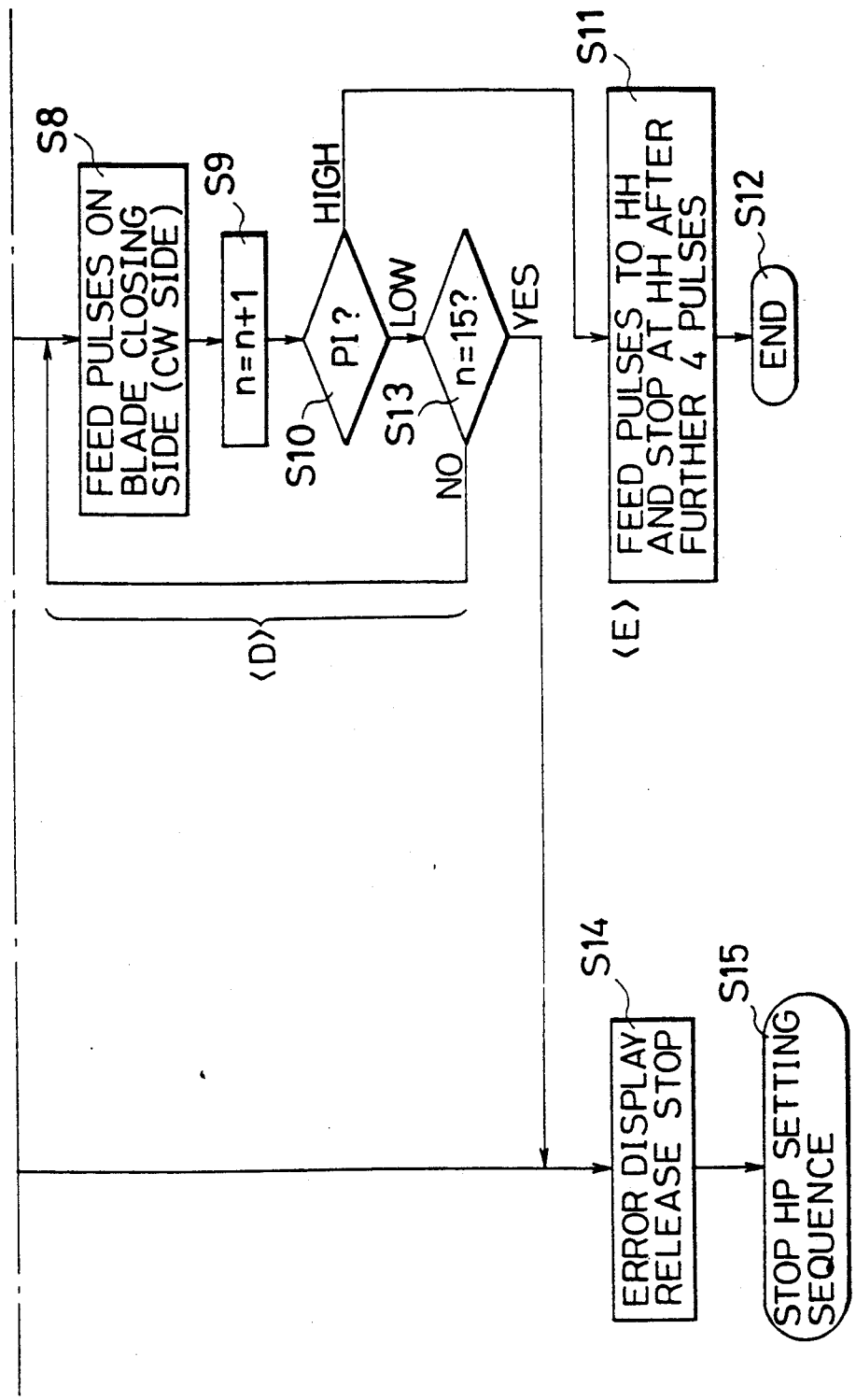
FIGS. 10(i) and (ii) is a first half of flowchart to illustrate a first half of home position setting control sequence of a basic reciprocating member used in the pulse-controlled camera as shown in FIG. 1.
Figure 11B:
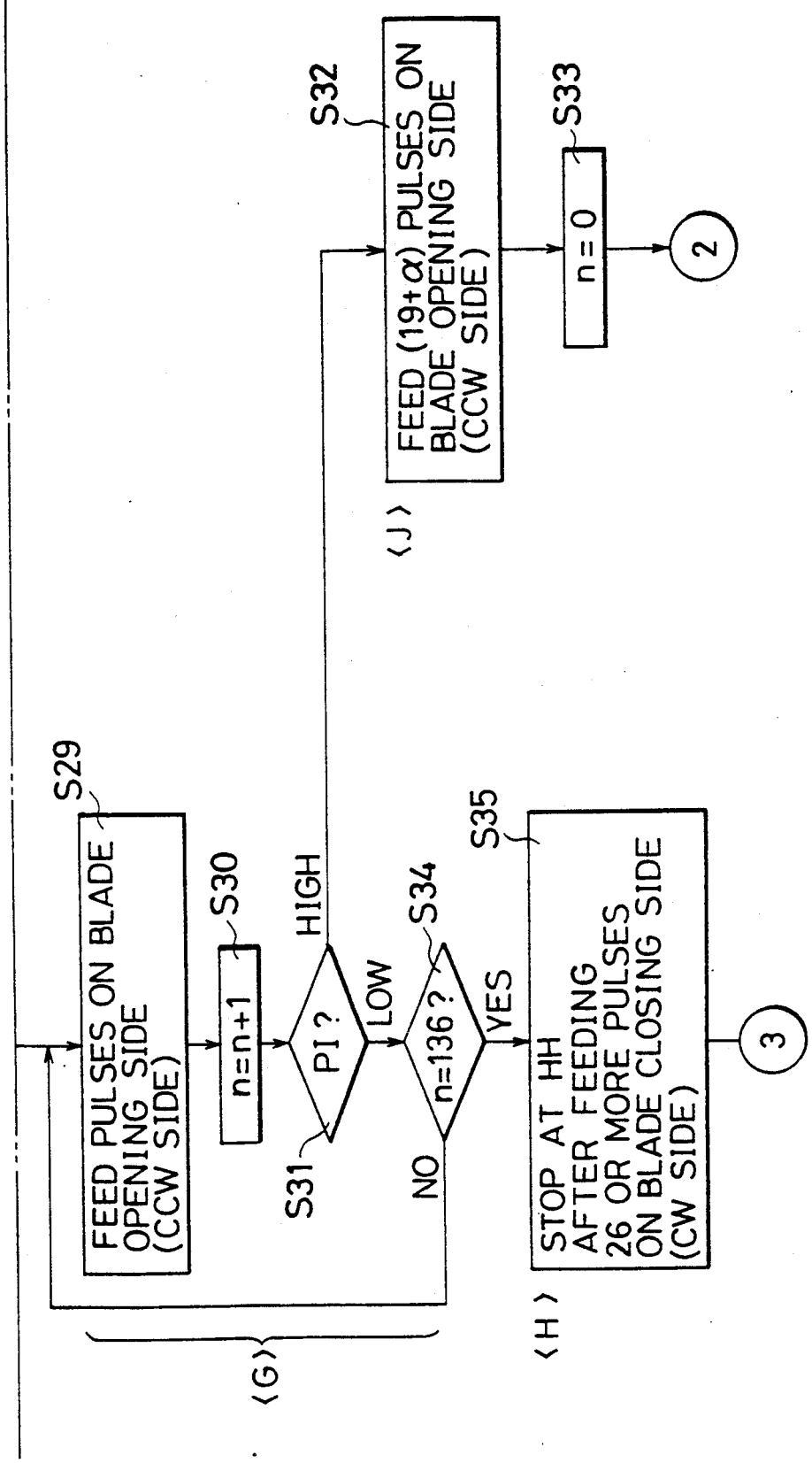
FIGS. 11(i) and (ii) is a latter half of flowchart to illustrate a latter half of the home position setting control sequence of the basic reciprocating member used in the pulse-controlled camera as shown in FIG. 1.

For that, the HP setting sequence of the basic reciprocating member 6 as shown in FIGS. 10($i$), ($iii$) and FIGS. 11($i$), ($ii$) is set to be automatically executed when the power switch 41 is turned on prior to the photo-taking in the embodiment as shown.

When the power switch 41 is turned on, a power is supplied to the photo interrupter 31, the automatic distance measuring device 43, the automatic exposure calculating device 44, the photograph disabled warning device 46, the memory device 47, and the pulse motor drive circuit 48 as well as to the total control section CPU, whereby the entire camera is set in an operable condition and is electrically reset at the same time. Further, the pulse counter 78 in the total control section CPU is reset in a state of n=0. These operations are carried out at S1 and S2.

An H signal or an L signal is output from the photo interrupter 31 to the HP setting calculating circuit 76 in the total control section CPU. For example, suppose the photo interrupter 31 outputs an H signal to the HP setting calculating circuit 76 at S3.

The output of H signal from the photo interrupter 31 means that the HP signal generating portion 63 of the basic reciprocating member 6 is interrupting the detection optical path of the photo interrupter 31 (the light beam for detection 33). Then, if the basic reciprocating member 6 is rotated in the forward direction or in the backward direction by a combination pulse number of pulses of not less than twelve from this position, one of the side end faces 63a and 63b of the HP signal generating portion 63 would be off from the detection optical path of the photo interrupter 31, whereby the signal from the photo interrupter 31 will be changed from the H signal to the L signal.

Thus, the HP setting calculating circuit 76 controls the basic reciprocating member 6 first to rotate by the combination pulse number of thirteen pulses counterclockwise (in the backward direction) at S4.

The pulse counter 78 starts counting the combination pulse number applied from the pulse motor drive circuit 48 to the pulse motor 34. During this operation, if the camera is in a normal operation condition, the HP signal generating portion 63 of the basic reciprocating member 6 is to leave the detection optical path of the photo interrupter 31 before the thirteen pulses have been applied, as shown in Process A to Process C in FIGS. 10($i$), ($ii$) and FIG. 12, whereby the signal of the photo interrupter 31 is changed from the H signal to the L signal. These operations are carried out at S5 and S6.

Once the signal from the photo interrupter 31 is changed from the H signal to the L signal as above, the HP setting calculating circuit 76 resets the pulse counter 78 to zero and controls the basic reciprocating member 6 to rotate by a combination pulse number of seven pulses counterclockwise. These are carried out at S6' and S7.

After the rotation operation with the seven pulses counterclockwise is finished, the HP setting calculating circuit 76 controls the basic reciprocating member 6 then to rotate by a combination pulse number of fifteen pulses clockwise (in the forward direction at S8). The pulse counter 78 also counts the combination pulse number applied from the pulse motor drive circuit 48 to the pulse motor 34.

In this operation, if the camera is in a normal condition, the CW side end face 63b of the HP signal generating portion 63 of the basic reciprocating member 6 interrupts the detection optical path of the photo interrupter 31 before the fifteen pulses have been applied as shown in Process D in FIGS. 10($i$), ($ii$) and FIG. 12, whereby the signal from the photo interrupter 31 is changed from the L signal to the H signal. This operation is carried out at S9 and S10.

Once the signal from the photo interrupter 31 is turned from the L signal to the H signal, as shown in Process E in FIGS. 10($i$) ($ii$) and FIG. 12, the HP setting calculating circuit 76 provides the pulse motor 34 with combination pulses from the time of the signal change up to a combination pulse phase preliminarily set to memorize in assembly adjustment, for example up to a pulse phase of HH in the present embodiment, and further rotates the pulse motor 34 from this point up to a position of next appearing HH phase, that is, to the phase of HH in advance of four pulses, where the pulse motor 34 is controlled to stop quickly.

The position of the basic reciprocating member 6 corresponding to the phase obtained in the camera adjustment where the pulse motor 34 is stopped, for example to the HH phase, is to become the HP of the basic reciprocating member 6 preliminarily set. This is at S11.

The basic reciprocating member 6 is rotated counterclockwise by seven pulses at Step S7 and thereafter clockwise by seven or more pulses at Step S8. The reason of this is that the camera in the embodiment as shown is structured to conduct the mechanical reset simultaneously with the electric reset.

Figure 13:
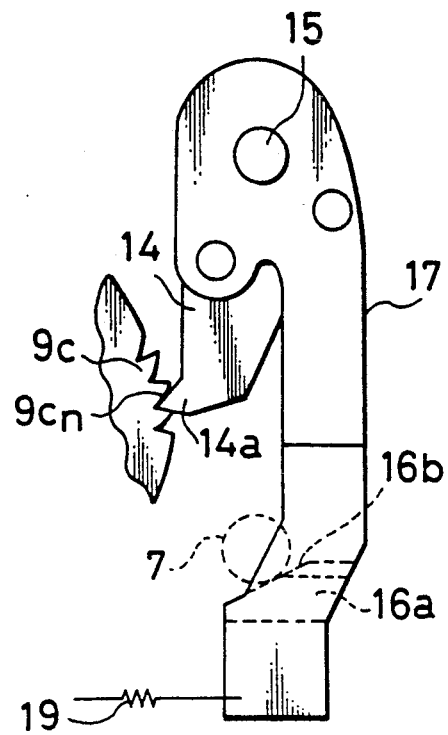
FIG. 13 is one of operation explanatory drawings to illustrate a connection relation between a first engaging pin of the basic reciprocating member and, a slant flank and a release moved portion of a reset member, and a connection relation between ratchet teeth of a ratchet base plate and a pawl of a ratchet pawl member as used in the pulse-controlled camera as shown in FIG. 1, which is an operation explanatory drawing to show a state in which the first engaging pin is engaged with the release moved portion of the reset member in a process of a forward rotation of the basic reciprocating member from a position of correct stop aperture of the shutter blades toward the home position.
Figure 14:
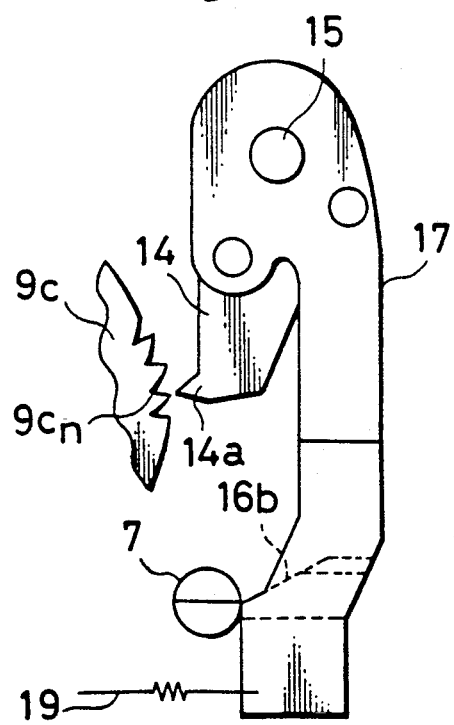
FIG. 14 is another of operation explanatory drawings to illustrate a connection relation between the first engaging pin of the basic reciprocating member and, the slant flank and the release moved portion of the reset member, and a connection relation between ratchet teeth of the ratchet base plate and the pawl of the ratchet pawl member as used in the pulse controlled camera as shown in FIG. 1, which is an operation explanatory drawing to show a state in which the basic reciprocating member further rotates in the forward direction from the state of FIG. 13 to make the first engaging pin rotate the release moved portion of the reset member in the counterclockwise direction so as to release the pawl of the ratchet pawl member from the ratchet teeth of the ratchet base plate.
Figure 15:
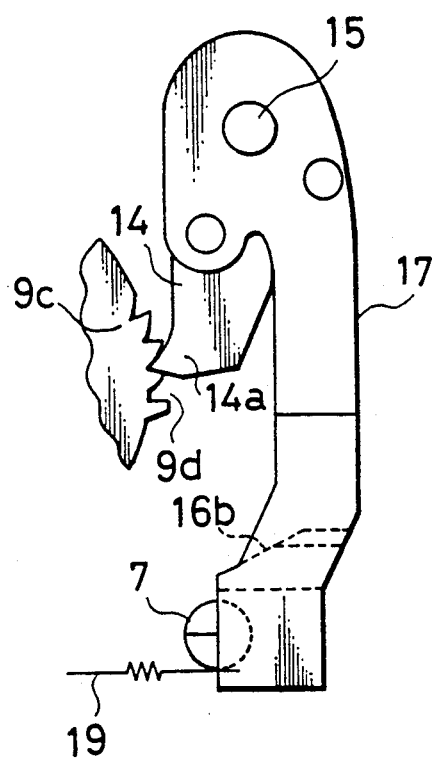
FIG. 15 is the other of operation explanatory drawings to illustrate a connection relation between the first engaging pin of the basic reciprocating member and, the slant flank and the release moved portion of the reset member, and a connection relation between ratchet teeth of the ratchet base plate and the pawl of the ratchet pawl member as used in the pulse controlled camera as shown in FIG. 1, which is an operation explanatory drawing to show a state in which the basic reciprocating member further rotates from the state of FIG. 14 to bring the pawl of the ratchet pawl member into engagement with a stopper of the ratchet teeth at an initial position.

In detail, the following operation is carried out prior to the photo-taking in the embodiment as shown. The basic reciprocating member 6 is first rotated counterclockwise by a predetermined amount, so that the first engaging pin 7 on the basic reciprocating member 6 pushes the slant flank 16a of the reset member 16 to pass the engagement position with the release moved portion 16b. The basic reciprocating member 6 is then rotated clockwise so that the first engaging pin 7 pushes to rotate the release moved portion 16b of the reset member 16 away from the ratchet teeth 9c of the ratchet base plate 9 (clockwise) as shown in FIG. 13 to FIG. 15, whereby the pawl 14a of the ratchet pawl member 14 is released from the engagement with the focusing step engagement teeth $9c_1$ to $9c_{31}$ of the ratchet teeth 9c to return the ratchet base plate 9 and the photo-taking lens L to the respective initial positions.

In the embodiment as shown, the counterclockwise predetermined rotation amount of the basic reciprocating member 6 is set as a combination pulse number for example of seven pulses, so that the HP setting calculating circuit 76 controls the basic reciprocating member 6 to sequentially rotate in the both directions in accordance with that.

The release operation of the ratchet pawl member 14 from the ratchet teeth 9c makes the ratchet base plate 9 and the photo-taking lens L return to the respective initial positions, whereby the mechanical reset is finished. Then, the HP setting sequence of the basic reciprocating member 6 is ended in this state at S12.

At Step S9 and Step S10, as long as the signal from the photo interrupter 31 remains in the L signal, the pulse counter 78 continues counting up to fifteen pulses in combination pulse number. If the counting is ended up to fifteen pulses, an abnormal state signal is provided from the H setting calculating circuit 76 to the photograph disabled warning judging circuit 79 in the embodiment as shown. Then, the photograph disabled warning judging circuit 79 judges the presence of the abnormal state in the camera and outputs the judgement signal to the photograph disabled warning device 46.

In other words, if the camera is in a normal condition and when the basic reciprocating member 6 is rotated clockwise by fifteen pulses from the position after it is rotated counterclockwise by seven pulses at Step S7, the signal of the photo interrupter 31 is to be changed from the L signal to the H signal. The significance that the signal change does not occur is that there is any abnormal state in the camera. Therefore, the embodiment as shown is arranged to operate the photograph disabled warning device 4 when the counting up to fifteen pulses is finished at S13 and S14.

The photograph disabled warning device 46 produces a warning of disabled photography to a photographer and inhibits the shutter release operation. Then, the HP setting calculating circuit 76 finishes the HP setting sequence of the basic reciprocating member 6 in this state at S15.

At Step S4 and Step S6 as described, the basic reciprocating member 6 is controlled to rotate counterclockwise at most by thirteen pulses in combination pulse number. If the output signal from the photo interrupter 31 remains in the H signal when the count number of the pulse counter 78 has reached thirteen pulses, which means that the basic reciprocating member 6 is not rotated as intended, the HP setting calculating circuit 76 stops the counting of the pulse counter 78 after thirteen pulses and controls the basic reciprocating member 6 to rotate clockwise (in the forward direction) by thirteen pulses in combination pulse number as shown in Process B in FIGS. 10(i), (ii) and FIG. 12. That is, the basic reciprocating member 6 is controlled to return to the position before the HP setting control thereof. This operation is carried out at S16 and S17.

Once the basic reciprocating member 6 returns to the position before the HP setting control, the control of Step S14 and Step S15 as described is executed to actuate the photograph disabled warning device 46 and to inhibit the shutter release operation. The HP setting sequence of the basic reciprocating member 6 is ended in this state, returning to Step S15.

The following explains mainly with FIGS. 11(i) (ii) about a case that an L signal is output from the photo interrupter 31 to the HP setting calculating circuit 76 at Step S3 as described above. The output of the L signal from the photo interrupter 31 means that the HP signal generating portion 63 of the basic reciprocating member 6 is out of the detection optical path of the photo interrupter 31 (the light beam for detection 33) clockwise (in the forward direction) or counterclockwise (in the backward direction). Thus, the HP setting calculating circuit 76 controls the basic reciprocating member 6 to rotate clockwise by twenty four pulses in combination pulse number in order to check whether the HP signal generating portion 63 is out of the detection optical path of the photo interrupter 31 on the counterclockwise side.

This is because that the counterclockwise rotation limit of the basic reciprocating member 6 from the HP is preliminarily set as twenty five pulses in combination pulse number. This operation is carried out at S21 in FIGS. 11(i), (ii).

During this operation, the pulse counter 78 counts the combination pulse number applied from the pulse motor drive circuit 48 to the pulse motor 34. If the HP signal generating portion 63 is out of the detection optical path of the photo interrupter 31 on the counterclockwise side, the CW side end face 63b of the HP signal generating portion 63 of the basic reciprocating member 6 is to interrupt the detection optical path of the photo interrupter 31 before the count number reaches twenty four pulses so as to change the signal from the photo interrupter 31 from the L signal to the H signal as shown in Process F in FIGS. 11(i), (ii) and FIG. 12. This operation is carried out at S22 and S23.

Once the signal from the photo interrupter 31 is changed from the L signal to the H signal before the count of the pulse counter 78 reaches twenty four pulses, the HP setting calculating circuit 76 provides the pulse motor 34 with combination pulses of from the time of signal change up to a pulse with a phase preliminarily obtained in adjustment of the camera, for example to a phase of HH, and quickly stops the pulse motor 34 at a next phase of HH appearing after the pulse motor 34 is rotated from the first HH by four pulses in combination pulse number. This control is the same as that at Step S11 as described. This control is carried out at Step S24.

When the pulse motor 34 is stopped, the HP setting calculating circuit 76 conducts film winding by one frame in that state and finishes the HP setting sequence of the basic reciprocating member 6 simultaneously with the end of film winding at S25 and S26.

However, if the count number of the pulse counter 78 should reach n=24 at Step S23, the HP signal generating portion 63 could be out of the detection optical path of the photo interrupter 31 on the clockwise side (or it could be unmoved). In this case, the HP setting calculating circuit 76 first resets the pulse counter 78 as n=0, and then rotates the basic reciprocating member 6 counterclockwise by 136 pulses in combination pulse number.

This is because the clockwise rotation limit of the basic reciprocating member 6 from the HP is preliminarily set to be 137 pulses in combination pulse number. This operation is carried out at S27 to S29. The pulse counter 78 counts the combination pulses applied from the pulse motor drive circuit 48 to the pulse motor 34.

If the camera is in a normal operation condition, the CCW side end face 63a of the HP signal generating portion 63 of the basic reciprocating member 6 interrupts the detection optical path of the photo interrupter 31 before the count number reaches 136 pulses as shown in Process G in FIGS. 11(i), (ii) so as to change the signal of the photo interrupter 31 from the L signal to the H signal at S30 and S31.

Once the signal of the photo interrupter 31 is changed from the L signal to the H signal before the count number of the pulse counter 78 reaches 136 pulses, the HP setting calculating circuit 76 controls the basic reciprocating member 6 to rotate counterclockwise by nineteen pulses $+\alpha$ in combination pulse number from the time of signal change as shown in Process J in FIGS. 11(i), (ii) and FIG. 12. This is carried out at S32.

According to such a control, the basic reciprocating member 6 passes the detection optical path of the photo interrupter 31 and rotates by at least seven pulses from the HP on the counterclockwise side, to reach the same position as at Step S7 (in Process C) as described above. Then, the HP setting calculating circuit 76 resets the pulse counter 78 as n=0 at the time after the rotation end at Step S33.

After that, the HP setting calculating circuit 76 continues executing the control of Step S8 to S11 in FIGS. 10(i), (ii) as described above to stop the basic reciprocating member 6 at the HP (at the position corresponding to the second HH phase in the applied pulses in the present embodiment) and then to finish the HP setting sequence of the basic reciprocating member 6 simultaneously with the end thereof as shown in Process D to Process E, returning to S12.

If the output signal from the photo interrupter 31 remains in the L signal after the count number of the pulse counter 37 has reached n=136 at Step S31, it is conceived that the basic reciprocating member 6 is not rotated as intended. In this case, the HP setting calculating circuit 76 stops the count of the pulse counter 78 at 136 pulses, and rotates the basic reciprocating member 6 from that position clockwise by twenty six or more pulses in combination pulse number then to quickly stop the pulse motor 34 when the pulse phase becomes the HH phase obtained in adjustment of the camera as shown in Process H in FIGS. 11(i), (ii) and FIG. 12. This operation is carried out at S34 and S35.

After that, the HP setting calculating circuit 76 continues executing the control of Step S14 and Step S15 in FIG. 10 as described above, to actuate the photograph disabled warning means 46 and to inhibit the shutter release operation, and thereafter finishes the HP setting sequence of the basic reciprocating member 6 in this state, returning to Step S15.

The shutter release operation is conducted after the completion of the HP setting sequence of the basic reciprocating member 6. However, in case of an electronically controlled camera, it is conceivable that the camera or the electric circuit could be turned into an abnormal state after the shutter release operation. Thus, in the embodiment as shown, the HP setting sequence of the basic reciprocating member 6 is checked immediately after the shutter release.

In detail, when the shutter release member 42 is pressed in photo-taking, the HP setting calculating circuit 76 first resets the pulse counter 78 as n=0 and then checks the output signal from the photo interrupter 31 at Steps S41 to S43 in FIGS. 10(i), (ii). If the signal from the photo interrupter 31 is in the L signal, the HP setting sequence below Step S21 in FIGS. 11(i), (ii) as described will be again executed. If the signal from the photo interrupter 31 is in the H signal, the photo-taking sequence is continued. This operation is carried out at Step S44.

The operation of the pulse-controlled camera arranged as above is next explained with reference to the timing charts in FIG. 7 to FIG. 9. For convenience of illustration, the automatic exposure calculation is assumed as exposure control, and the forward and backward rotation control of the basic reciprocating member 6 is explained concerning an example in which the basic reciprocating member 6 is returned to the HP with respective combination pulse numbers in case of return from the in-focus position to the HP and in case of return from the correct stop aperture position of the shutter blades 25, 26 to the HP.

When the power switch 41 is turned on in photo-taking, a predetermined voltage is applied to the photo interrupter 31, the automatic distance measuring device 43, the subject luminance detecting device 44, the photograph disabled warning device 46, the memory device 47, and the pulse motor drive circuit 48 as well as to the total control section CPU so as to turn the entire camera into an operable condition, and the total control section CPU proceeds the HP setting sequence of the basic reciprocating member 6 through the HP setting calculating circuit 76 at the same time.

If the camera is in a normal condition, the basic reciprocating member 6 is correctly located at the HP (at the position of HH pulse phase) as described above, and thereby the three members of the ratchet base plate 9, the lens feeding member 2, and the lens holding frame 4 are positioned at the respective initial positions thereof.

When the first step of the stroke operation of the shutter release member 42 is carried out in this state, the photo-taking sequence stored in the program storing device ROM is proceeded based on the operation signal, in which a command to start the distance measurement operation and the photometry operation with a subject is first transmitted to the AF device 43 and the subject luminance detecting device 44.

Then, the AF device 43 detects information concerning the object distance and outputs the information to the object distance calculating circuit 73 of the total control section CPU. The subject luminance detecting device 44 detects information about a luminance of the subject and outputs the information to the correct exposure calculating circuit 74.

Then, the object distance calculating circuit 73 calculates a film-to-subject distance (object distance) at that time based on the object distance information from the AF device 43, and determines a feeding amount (focusing amount) of the photo-taking lens L corresponding to the calculation result by selecting one focusing step $L_n$ among the focusing steps $L_1$ to $L_{31}$.

A setting value of the selected focusing step $L_n$ is set as a first stage forward rotation number of the pulse motor 34 necessary for rotating the basic reciprocating member 6 from the HP thereof to the position of the focusing step $L_n$ in the forward direction (clockwise). Further, the setting value is set in the total control section CPU as a combination pulse number ($4n+\alpha$ pulses) of the forward direction applied from the pulse motor drive control circuit 77 through the pulse motor drive circuit 48 to the pulse motor 34. The $\alpha$ pulses are given as an adjustment value as described later.

At the same time, a combination pulse number corresponding to the second stage backward rotation number of the pulse motor 34 is set in the total control section CPU as a combination pulse number different in directionality but same in number as that at the first stage.

The correct exposure calculating circuit 74 calculates a correct exposure amount (correct EV data) at that time based o the subject luminance information from the subject luminance detecting device 44 and the ISO speed information from the film speed detecting means (not shown), and then determines a correct stop aperture value of the shutter blades 25, 26 corresponding to the calculation result and a time in which the shutter blades 25, 26 are opened between the position of the trigger point at the time $t=t_0$ and the position of the correct stop aperture value at the time $t=t_{AE}$.

The time between the trigger point ($t=t_0$) and the correct stop aperture value ($t=t_{AE}$) of the shutter blades 25, 26 is set as a time after the combination pulse number (for example fifteen pulses) necessary for rotating the basic reciprocating member 6 which has returned to the HP by the second stage backward rotation of the pulse motor 34 from the HP to the position of the trigger point at $t=t_0$.

Consequently, the third stage backward rotation number of the pulse motor 34 is a sum pulse number for example of fifteen pulses necessary for rotating the basic reciprocating member 6 from the HP to the trigger point position at $t=t_0$ with the combination pulse number corresponding to the opening time of the shutter blades 25, 26 to the correct stop aperture value.

At the same time, a combination pulse number corresponding to the fourth stage forward rotation number of the pulse motor 34 is set in the total control section CPU as a combination pulse number (sum number) different in directionality but same in number as that for the third stage.

Now, when the second step of the stroke operation of the shutter release member 42 is made, the photo-taking sequence is proceeded based on the operation signal, in which a combination pulse number of forward direction (for example $4n+\alpha$ pulses) is first applied from the pulse motor drive control circuit 77 through the pulse motor drive circuit 48 to the pulse motor 34.

Then, the pulse motor 34 rotates in the forward direction, so that the rotation drive force thereof is transmitted from the output gear 35 via the large diameter gear portion 36b and the small diameter gear portion 36a of the reduction gear 36 to the partial gear portion 61 of the basic reciprocating member 6 to rotate the basic reciprocating member 6 from the HP thereof in the clockwise direction in FIG. 1.

The press protrusion 62 of the basic reciprocating member 6 presses to rotate through the press connection plane 62a the moved end face 9b of the ratchet base plate 9 clockwise, so that the ratchet base plate 9 is also rotated in the same direction against the biasing force of the biasing spring 13 applied to the biased gear 11. Both the ratchet base plate 9 and the basic reciprocating member 6 are rotated finally to the position of the selected focusing step $L_n$.

In this case, since the rotation direction of the ratchet base plate 9 is forward, the pawl 14a of the ratchet pawl member 14 repeats a leaving motion (which is a motion away from the optical axis O), sliding over the ratchet teeth 9c of the ratchet base plate 9 during the rotation of the ratchet base plate 9 while permitting the forward rotation of the ratchet base plate 9 (as well as the basic reciprocating member 6).

While the ratchet base plate 9 is rotated in the forward direction, the lens feeding member 2 connected by the fastening screw 10 to the ratchet base plate 9 is also rotated in the forward direction together with the ratchet base plate 9, feeding the lens holding frame 4 forward along the optical axis O by the cam effect of the three face cam portions 2b. Thus, the lens holding frame 4 is displaced toward the subject against the biasing force of the biasing springs 5 on the pair of lens holding frame guide poles 3.

Once the pulse motor 34 is rotated by the combination pulse number applied, the total control section CPU controls the pulse motor 34 so as to quickly stop the basic reciprocating member 6 and the ratchet base plate 9 at the position of the selected focusing step $L_n$, whereby the lens holding frame 4 is held at the fed position by the biasing force of the biasing springs 5.

Namely, the photo-taking lens L is located at the in-focus position corresponding t the object distance at that time, where the focusing operation is completed. In this process, the biasing spring 13 becomes biased by the rotation of the ratchet base plate 9. While the basic reciprocating member 6 rotates in the forward direction, the CCW side end face 63a of the HP signal generating portion 63 formed on the basic reciprocating member 6 becomes out of the detection optical path of the photo interrupter 31 at an early stage of the rotation to change the output signal of the photo interrupter 31 from the H signal to the L signal. After the signal from the photo interrupter 31 is changed into the L signal, the basic reciprocating member 6 is programed to continue rotating in the forward direction as described above. Thus, the basic reciprocating member 6 continues rotating irrespective of the signal change of the photo interrupter 31.

When the basic reciprocating member 6 and the ratchet base plate 9 are rotated to the position of the selected focusing step $L_n$ (the in-focus position) and are stopped at the position, the pulse motor drive control circuit 77 immediately applies to the pulse motor 34 the combination pulse number necessary for the second stage backward rotation. This combination pulse number is different in directionality but same in pulse number as the combination pulse number applied at the first stage as described above.

The embodiment as shown is arranged such that the backward combination pulse number of the third stage is applied to add to the combination pulse number of the second stage (for example fifteen pulses+ten pulses). Thus, the pulse motor 34 first rotates counterclockwise (in the backward direction) by the combination pulse number of the second stage to rotate the basic reciprocating member 6 from the position of the focusing step $L_n$ toward the HP. When the basic reciprocating member 6 has reached the HP, the basic reciprocating member 6 continues rotating in the same backward direction by the combination pulse number of the third stage to rotate the basic reciprocating member 6 clockwise from the HP to the position where the correct stop aperture is formed. In this occasion, only the basic reciprocating member 6 rotates clockwise, but the ratchet base plate 9 remains at the position of the focusing step $L_n$. The reason of this is as follows.

As described, when the basic reciprocating member 6 and the ratchet base plate 9 are rotated to the position of the selected focusing step $L_n$ and are stopped at the position, the pawl 14a of the ratchet pawl member 14 engages with a bottom portion of a ratchet engaging tooth $9c_n$ of the ratchet teeth 9c corresponding to the focusing step $L_n$ by the biasing force of the biasing spring 19. In this state, even though the ratchet base plate 9 is likely to follow the basic reciprocating member 6 rotated counterclockwise toward the HP by the biasing force of the biasing spring 13, the pawl 14a of the ratchet pawl member 14 becomes interlocked with a tooth portion (backstop portion) of the ratchet engaging tooth $9c_n$ corresponding to the focusing step $L_n$ to inhibit the ratchet base plate 9 from rotating in the counterclockwise direction.

Since the counterclockwise rotation of the ratchet base plate 9 is inhibited by the ratchet pawl member 14, the return motion of the lens feeding member 2 to the lens initial position is also inhibited. Thus, the lens holding frame 4 (therefore, the photo-taking lens L) is held at the in-focus position set by the object distance calculating circuit 73 while the basic reciprocating member 6 is in the backward rotation of the second stage and of the third stage.

While the basic reciprocating member 6 is in the rotation of the second stage and of the third stage, the first engaging pin 7 planted in the basic reciprocating member 6 comes into contact with the slant flank 16a of the reset member 16. In this occasion, the press inclined surface 7a of the first engaging pin 7 pushes up the slant flank 16a while bending the elastic connection plate 17 whereby displacing only the reset member 16 upward (in the direction of the thickness of the elastic connection plate 17) and passing there. Therefore, the stop operation by the pawl 14a of the ratchet pawl member 14 to the appointed ratchet engaging tooth $9c_n$ is maintained as it is.

In the process of the second stage and third stage rotation, the CCW side end face 63a of the HP signal generating portion 63 first interrupts the detection optical path of the photo interrupter 31 during the second stage rotation to change the output signal of the photo interrupter 31 from the L signal to the H signal.

After that, the CW side end face 63b of the HP signal generating portion 63 becomes out of the detection optical path of the photo interrupter 31 in the process of the third stage rotation to change the output signal of the photo interrupter 31 from the H signal to the L signal. The embodiment as shown is arranged in either case to continue the drive control of the pulse motor 34 irrespective of the signal change, so that the basic reciprocating member 6 continues rotating in the counterclockwise direction.

In the process of the third stage rotation, the second engaging pin 8 planted in the basic reciprocating member 6 comes into engagement with the projection arm 20a of the shutter blade opening and closing lever 20 so as to press to rotate the shutter blade opening and closing lever 20 clockwise from the initial position (stop position) where the lever is press-contacted with the stopper 23. Thus, the shutter blade opening and closing lever 20 rotates clockwise about the rotation support shaft 21 against the biasing force of the biasing spring 22.

When the shutter blade opening and closing lever 20 is thus rotated clockwise, the aperture drive pin 24 planted in the shutter blade opening and closing lever 20 moves in the cam holes 25a, 26a of the shutter blades 25, 26 to rotate the shutter blades 25, 26 in the opposite directions to each other about the respective rotation support shafts 27, 28, whereby the shutter blades 25, 26 are opened from the fully closed state toward the maximum stop aperture.

When the basic reciprocating member 6 rotates by the rotation amount corresponding for example to fifteen pulses in combination pulse number, the shutter blades 25, 26 reach the trigger point.

As described, the trigger point is a start point of the shutter exposure time t ($t=t_0$). Once the basic reciprocating member 6 reaches this position, the total control section CPU actuates the clock circuit 80 to start the counting of the shutter blade opening time set by the correct exposure calculation circuit 74.

The pulse motor 34, however, continues rotating in the backward direction until the count by the clock circuit (timer) 80 becomes a predetermined value while making the basic reciprocating member 6 continue rotating counter clockwise.

Once the count by the clock circuit 80 reaches the predetermined shutter blade opening time, the total control section CPU quickly stops the pulse motor 34. Thus, the basic reciprocating member 6 (as well as the pulse motor 34) once stops quickly when the shutter blade opening time has elapsed.

In this case, the time from the trigger point to the stop position of the basic reciprocating member 6 is the shutter blade opening time ($t=t_0$ to $t=t_{AE}$), and this stop position is the position of the correct stop aperture value of the shutter blades 25, 26.

When the pulse motor 34 is quickly stopped, the total control section CPU applies to the pulse motor 34 a pulse number equal to the third stage counterclockwise combination pulse number (for example, fifteen pulses + pulse number corresponding to the shutter blade opening time) as a rotation number of the pulse motor 34 at the fourth stage, whereby the pulse motor 34 starts rotating in the forward direction.

Then, the basic reciprocating member 6 starts rotating clockwise (in the forward direction) immediately from the position of the correct stop aperture value toward the HP, and the shutter blade opening and closing lever 20 follows it to start rotating (returning) counterclockwise toward the initial position by the biasing force of the biasing spring 22. It was mentioned before that the pulse width of the combination pulses for opening the shutter blades 25, 26 is different from that for closing.

While the basic reciprocating member 6 rotates clockwise, the shutter blade opening and closing lever 20 follows it to rotate counterclockwise. During this motion, the shutter blades 25, 26 return from the position of the correct stop aperture value (at $t=t_{AE}$) again to the trigger point (the position at $t=t_0$) to complete the predetermined exposure time, and after that returns to the initial position (the position in the fully closed state) where it press-contacts with the stopper 23. The series of operations complete the exposure operation in the automatic exposure control method.

In case that the flashmatic mechanism 45 is used for the photo-taking, the shutter blades 25, 26 first open from the initial position through the trigger point (the position at $t=t_0$) to the position of the correct stop aperture value (the position at $t=t_{FM}$) determined by the aperture value information of the flashmatic mechanism 45, and return from the position of the correct stop aperture value again via the trigger point (the position at $t=t_0$) to the initial position when the basic reciprocating member 6 starts rotating clockwise. The series of operations complete the exposure operation in the flashmatic mode.

The exposure operation is ended in either exposure mode when the shutter blade opening and closing lever 20 returns to the initial position, but the fourth stage clockwise rotation operation of the basic reciprocating member 6 continues after the completion of the exposure operation.

When the basic reciprocating member 6 rotates clockwise to reach the predetermined proximate position at the end of rotation, the first engaging pin 7 on the basic reciprocating member 6 comes into engagement with the release moved portion 16b of the reset member 16 as shown in FIG. 13 and pushes the release moved portion 16b of the reset member 16 in the direction to separate it from the ratchet teeth 9c of the ratchet base member 9 (counterclockwise), whereby rotating the reset member 16 (as well as the ratchet pawl member 14) counterclockwise about the rotation support shaft 15 thereof.

Therefore, the pawl 14a of the ratchet pawl member 14 is separated from the focusing step engagement tooth $9c_n$ in the ratchet teeth 9c engaged therewith, as shown in FIG. 14.

Accordingly, the ratchet base plate 9 having been stopped at the in-focus position (the position of the focusing step engagement tooth $9c_n$) is released from the stop condition when the pawl 14a of the ratchet pawl member 14 is separated from the focusing step engagement tooth $9c_n$, and starts rotating counterclockwise (in the backward direction) toward the initial position thereof by the biasing force of the biasing spring 13 applied to the biased gear 11. The separation position is at the position within seven pulses in combination pulse number from the time when the signal of the photo interrupter 31 is changed from the H signal to the L signal, as described above.

Once the ratchet base plate 9 starts rotating counterclockwise from the position of the focusing step engagement tooth $9c_n$ toward the initial position, the lens feeding member 2 also rotates in the same direction therewith to nullify the feeding cam effect of the face cam portions 2b onto the rear end face 4b of the lens holding frame 4, whereby the lens holding frame 4 (as well as the photo-taking lens L) having been fed at the in-focus position returns to the lens initial position (the position as shown in FIG. 2) by the biasing force of the biasing spring 5.

The counterclockwise rotation operation of the ratchet base plate 9 continues after the pawl 14a of the ratchet pawl member 14 is separated from the focusing step engagement tooth $9c_n$, and finally stops at the position where the pawl 14a of the ratchet pawl member 14 is engaged with the initial position stopper 9d of the ratchet base plate 9, as shown in FIG. 15. The engagement position is the initial position of the ratchet base plate 9. The reason of this is as follows.

The pawl 14a of the ratchet pawl member 14 is in the state where it is separated from the ratchet teeth 9c only in a short time after the first engaging pin 7 pushes to rotate the release moved portion 16b of the reset member 16 to separate the pawl 14a having been engaged with the ratchet teeth 9c from the engagement position therewith until the first engaging pin 7 leaves the contact with the release moved portion 16b. After this time elapsed, the pawl 14a at the position of separation is rotated clockwise by the biasing force of the biasing spring 19 again to engage with the outer periphery of the ratchet base plate 9.

The embodiment as shown is so arranged considering relations between the counterclockwise rotation speed of the ratchet base plate 9 and the time therefor and between the clockwise rotation speed of the basic reciprocating member 6 and the time therefor that the initial position stopper 9d in the ratchet teeth 9c is made at the position where the pawl 14a of the ratchet pawl member 14 having been separated again comes into engagement with the ratchet teeth 9c and that the initial position of the ratchet base plate 9 may be set within the short time. A slight extra room is given for setting the engagement position in respect of position and time in the embodiment as shown.

The basic reciprocating member 6 continues rotating clockwise (in the forward direction) at the fourth stage after the first engaging pin 7 pushes to rotate the release moved portion 16b of the reset member 16 thereby to move the pawl 14a of the ratchet pawl member 14 back and forth, that is, after the ratchet base plate 9 starts rotating counterclockwise toward the initial position thereof. At the end of the fourth stage clockwise rotation, the CW side end face 63b of the HP signal generating portion 63 of the basic reciprocating member 6 reaches the position where it interrupts the detection optical path of the photo interrupter 31.

Then, the output signal of the photo interrupter 31 changes from the L signal to the H signal, and the total control section CPU receiving the signal change further rotates the pulse motor 34 through the pulse motor drive control circuit 77 and quickly stops the pulse motor 34 when the second combination phase preliminarily stored in the memory device appears. Therefore, the basic reciprocating member 6 returns to the HP under the control with extremely high precision and reliability.

After that, the film feed control is carried out by the total control section CPU, and the photo-taking sequence is finished when the film feed operation is completed.

In the present invention, the pulse control is also employed for the assembling adjustment of the basic reciprocating member with the mechanical members for conducting the feeding operation of the lens L and for conducting the exposure operation.

It is usual as described in production of the mechanical means for conducting the feeding operation of the lens L and for conducting the opening and closing operation of the aperture and shutter blades that there are production errors and assembly errors caused in machining and in assembling. The embodiment as shown is arranged to deal with the errors in machining and in assembling in an electric control manner.

To achieve the object, the embodiment as shown is arranged as follows.

(i) First, the mechanical means for conducting the feeding operation of the lens L and the mechanical means for conducting the opening and closing operation of the aperture and shutter blades are independently produced and assembled as respective mechanical means, and these mechanical means are actuated by the forward and backward rotation operation of the basic reciprocating member 6 from the HP.

(ii) The HP setting circumstance of the basic reciprocating member 6 is always monitored, and the HP, which is the reference position of the camera operation, is made always coincident with the position as designed.

(iii) The feeding position of the lens L is set using the depth of field of view for example by means of thirty one focusing steps $L_1$ to $L_{31}$. Bottom portions of the focusing step engagement teeth $9c_1$ to $9c_{31}$ achieving the focusing steps $L_1$ to $L_{31}$ are formed in length (rotation angle) of four pulses in combination pulse number. The engagement of a tooth with the pawl 14a of the ratchet pawl member 14, which actually determines the step position, is within the range of the four pulse length, so that the mechanical engagement of the engagement teeth $9c_1$ to $9c_{31}$ with the pawl 14a is achieved in the general mechanical precision.

(iv) The designing position of the focusing step engagement tooth $9c_0$, which is the feeding start reference position of the photo-taking lens L, is set adjustable depending upon the mechanical errors in each camera, using a method of electric control in which the combination pulse number applied to the pulse motor 34 is adjusted while the basic reciprocating member 6 is rotated from the HP thereof clockwise (in the forward direction).

(v) Similarly, the trigger point (the position at $t=t_0$) of the shutter blades 25, 26, which is the reference for exposure time calculation, is set adjustable depending upon the mechanical errors in each camera, using the method of electric control in which the combination pulse number applied to the pulse motor 34 is adjusted while the basic reciprocating member 6 is rotated from the HP counterclockwise (in the backward direction).

The adjustment of the combination pulse number applied to the pulse motor 34 is such that an increase or decrease for example of one pulse is uniformly applied to each camera as shown by dotted lines in FIG. 9 and that fine adjustment is carried out by a time constant.

These adjustment values are stored in the memory device 47 comprising for example $E^2PROM$ in each camera as described above. The adjustment values are added to the combination pulse numbers output from the object distance calculating circuit 73 and the correct exposure calculating circuit 74 in operation of the basic reciprocating member 6, in focusing and in exposure thereby to be output from the pulse motor drive control circuit 77 to the pulse motor 34.

Figure 16:
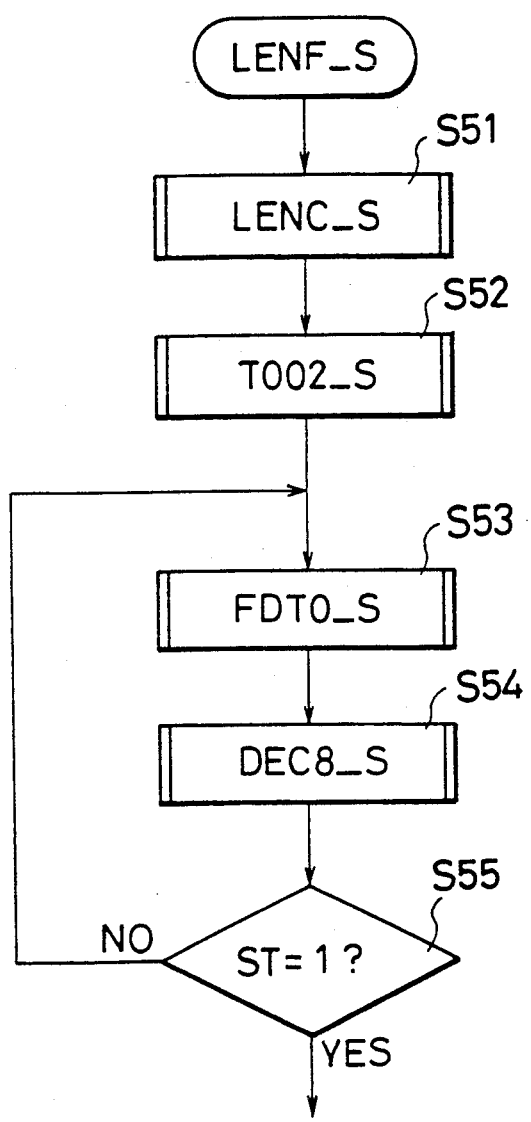
FIG. 16 is a partial flowchart to illustrate a first half of the photo-taking lens focusing operation in a flowchart of mechanical error adjustment when the mechanical error adjustment method is achieved in production of the pulse-controlled camera as shown in FIG. 1.
Figure 17:
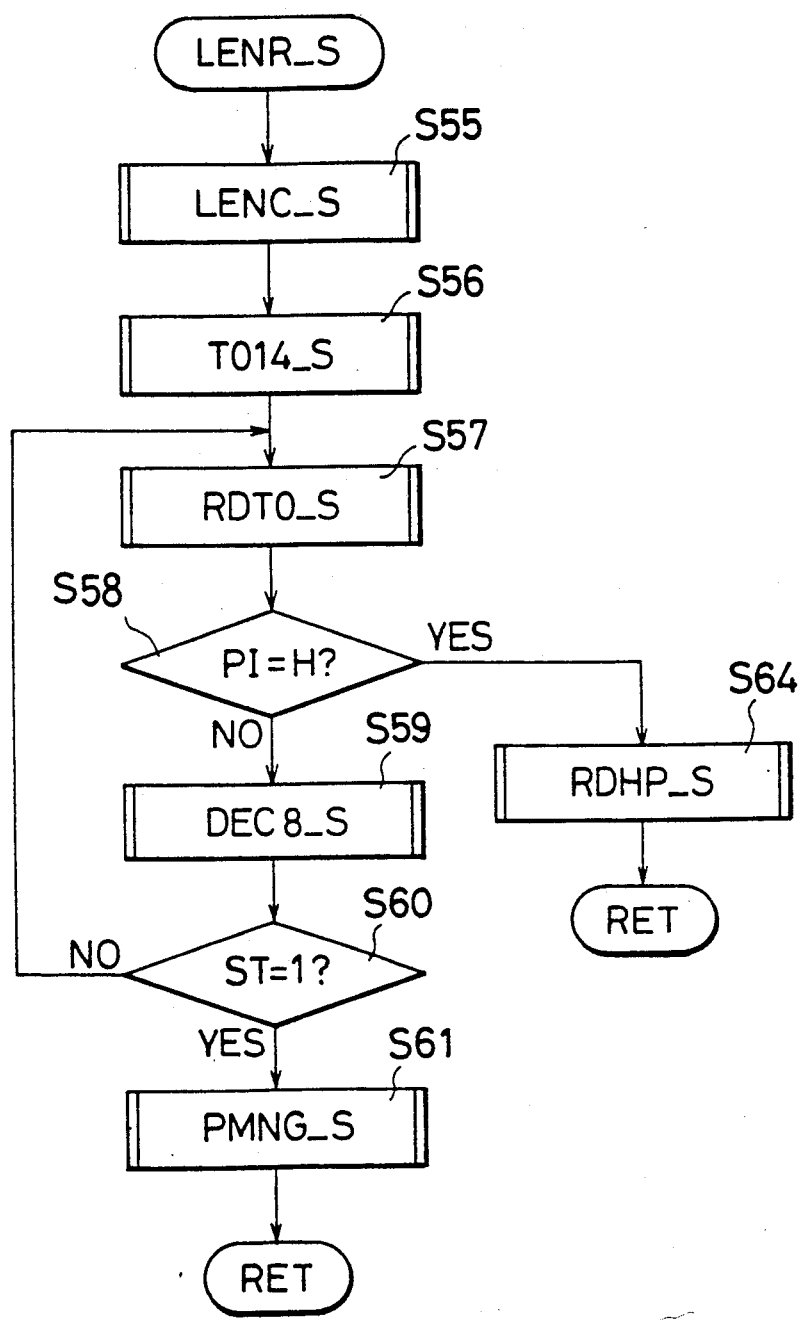
FIG. 17 is a partial flowchart to illustrate a latter half of the photo-taking lens focusing operation in a flowchart of mechanical error adjustment when the mechanical error adjustment method is accomplished in production of the pulse-controlled camera as shown in FIG. 1.

A specific control method using the correction values is explained in the following. FIG. 16 and FIG. 17 show a flowchart for the focusing operation of the lens L.

First, when the lens L (the lens holding frame 4) is fed out from the lens initial position to an in-focus position, as shown in FIG. 16, the focusing step $L_n$ corresponding to the object distance information from the object distance calculating circuit 73 and the adjustment values from the memory device 47 are input into the read-/write memory device (as will be simply referred to as "memory device") RAM of the total control section CPU from the memory device 47, to set the combination pulse number up to the focusing step engagement tooth $9c_n$ in actual feeding of the lens L.

In this case, the combination pulse number is set as a sum of the step number "STEP" from the HP of the basic reciprocating member 6 to the lens initial position including the adjustment value (for example one pulse) and the feeding pulse number (AFSD) of the photo-taking lens L from the initial position multiplied by four. At the same time, the total control section CPU provides the pulse width changing device 72 with a command to set the pulse width $t_W$ of the combination pulses to be applied at that time as 2 ms as shown in FIG. 7. These are carried out at S51 and S52.

After the combination pulse number and the pulse width for feeding the photo-taking lens L are determined as above, the total control section CPU provides the pulse motor 34 through the pulse motor drive control circuit 77 with the combination pulse number to drive the pulse motor 34 in each 2 ms in the forward direction, controlling the forward rotation drive of the pulse motor 34. This is carried out at S53.

The total control section CPU continues decreasing the combination pulse number applied and stored in the memory device RAM one by one during the rotation of the pulse motor 34, and quickly stops the pulse motor 34 when the subtraction reaches zero (when the pulse motor 34 is rotated by the predetermined combination pulse number). This is done at S54 and S55.

When the basic reciprocating member is returned to the HP, the same pulse number as the combination pulse number put at above Step S51 of LENR_S is set in the memory device RAM as shown in FIG. 17. At the same time, the total control section CPU provides the pulse width changing device 72 with a command to set the pulse width $t_W$ of the combination pulses applied at that time as 1.4 ms as shown in FIG. 7. This is carried out at S56.

Once the combination pulse number and the pulse width $t_W$ for returning the basic reciprocating member are determined as above, the total control section CPU provides the pulse motor 34 through the pulse motor drive control circuit 77 with the combination pulse number as described to drive the pulse motor 34 in each 1.4 ms in the backward direction, controlling the backward rotation drive of the pulse motor 34. This is carried out at S57.

The total control section CPU continues decreasing the combination pulse number one by one during the rotation of the pulse motor 34, while checking the output signal of the photo interrupter 31 upon each end of subtraction.

When the output signal of the photo interrupter 31 is turned into the H signal, the flow leaves this loop to proceed to the HP setting control of the basic reciprocating member 6. This is at S64.

At the same time, the total control section CPU decreases the combination pulse number applied one by one.

When the subtraction result of the combination pulse number is zero and if the output signal of the photo interrupter 31 is not turned into the H signal even with the ST flag being "1", the total control section CPU actuates the photograph disabled warning device 46, because the camera is in an abnormal state. This is at S61.

Figure 18:
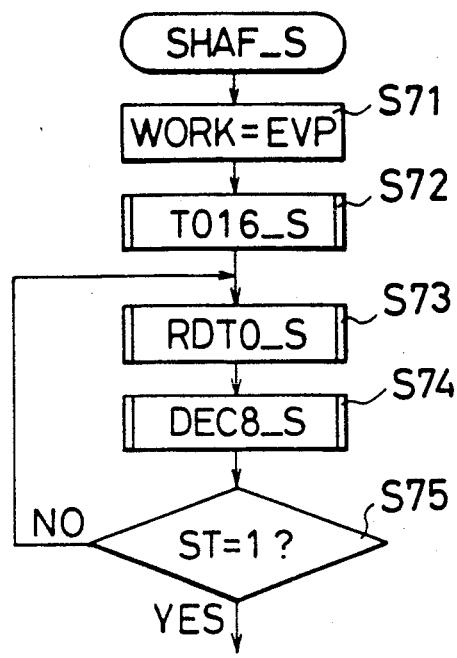
FIG. 18 is a flowchart to illustrate the shutter blade opening operation in a flowchart of mechanical error adjustment when the mechanical error adjustment method is accomplished in production of the pulse-controlled camera as shown in FIG. 1.
Figure 19:
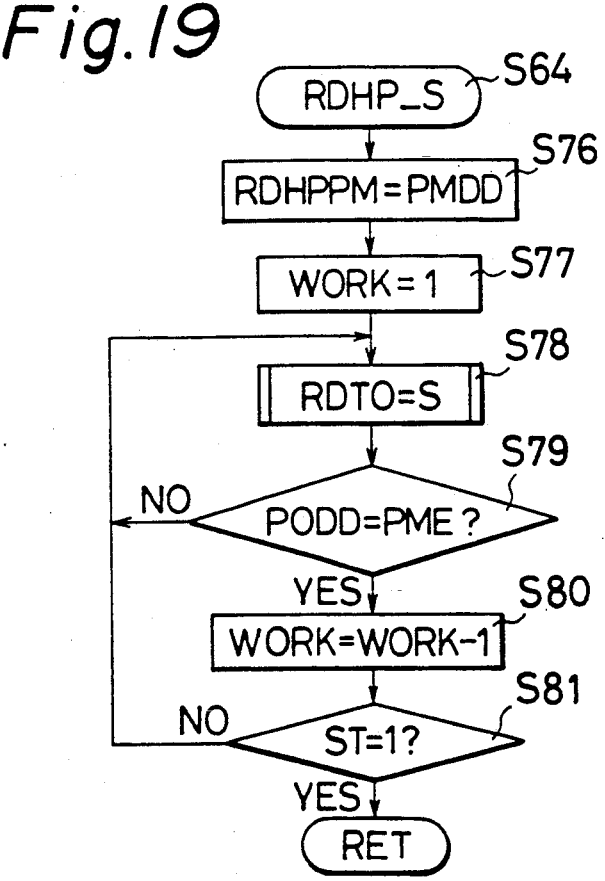
FIG. 19 is a flowchart related to the home position setting control operation in a flowchart of mechanical error adjustment when the mechanical error adjustment method is accomplished in production of the pulse-controlled camera as shown in FIG. 1.

FIG. 18 and FIG. 19 is a flowchart for the opening and closing operation (the exposure operation) of the shutter blades 25, 26.

First in opening the shutter blades 25, 26, the total control section CPU reads from the memory device 47 and puts into the memory device RAM a pulse number =adjustment value (EVP) necessary for rotating the basic reciprocating member 6 from the HP to the trigger point of the shutter blades 25, 26 as shown in FIG. 18. At the same time, the total control section CPU provides the pulse width changing device 72 with a command to set the pulse width $t_W$ of the combination pulses applied at that time as 1.536 ms as shown in FIG. 7. These are carried out at S71 and S72.

The combination pulse number and the pulse width from the HP to the trigger point are thus determined, the total control section CPU provides the pulse motor 34 through the pulse motor drive control circuit 77 with the combination pulse number to drive the pulse motor 34 in each 1.536 sec. in the backward direction, controlling the backward rotation drive of the pulse motor 34. This is carried out at S73.

The total control section CPU continues decreasing the applied combination pulse number one by one during the rotation of the pulse motor 34, and sets "1" for the ST flag when the subtraction result becomes zero (when the pulse motor 34 is rotated by the predetermined combination pulse number). This is at S74 and S75.

After that as described above, the total control section CPU continues rotating the pulse motor 34 in the backward direction by the amount corresponding to the shutter blade opening time set by the correct exposure calculating circuit 74, and further controls the pulse motor 34 to rotate in the forward direction to execute the opening and closing operation of the shutter blades 25, 26.

The following explains the operation when Step S58 is affirmed in FIG. 17 showing the flowchart for the focusing operation of the lens L.

When Step S58 is affirmed, that is, when the output signal of the photo interrupter 31 is turned into the H signal, the flow proceeds to a subroutine "RDHP_S" for carrying out the normal HP setting control operation of the basic reciprocating member 6. This is carried out at S64.

FIG. 19 is a flowchart to show the subroutine "RDHP_S". First, since each of the backward drive pulse data output at "RDT0_S" of Step S57 is input into the HP setting calculating circuit 76, the drive pulse data (for example PM0=H and PM2=H) at the time when the output signal of the photo interrupter 31 is changed from the L signal to the H signal is put and stored in the memory device RAM at S76.

Then, 1 is set in the RAM at S77, and the pulse motor drive control circuit 77 applies the combination pulse number to the pulse motor 34 to drive the pulse motor 34 in each 1.4 ms in the backward direction in the same manner as the process at Step S57, controlling the rotation drive of the pulse motor 34. This is at S78.

The total control section CPU reads the initial data PME stored in the memory device 47 to compare the data with the drive pulse data PMDD successively input thereinto. The total control section CPU repeats the comparison until the drive pulse data PMDD becomes coincident with the initial data PME, and when PMDD=PME, the total control section CPU puts −1 for subtraction into the RAM into which 1 has been put. This is at S80.

The above subtraction sets the ST flag. A borrow occurs at second PMDD=PME after the output signal of the photo interrupter 31 is changed from the L signal to the H signal, so that the ST flag becomes "1", whereby the pulse motor 34 is quickly stopped, finishing the home position setting control operation.

The adjustment of the home position (HP) (a method to obtain the drive pulses to the home position) may be carried out by detecting the drive pulses at the time when the output of the photo interrupter 31 is changed from the L signal to the H signal, while actually driving the pulse motor 34. Namely, the drive pulse data of the home position can be obtained by knowing the drive pulses at the time when the output of the photo interrupter 31 is changed from the L signal to the H signal.

The present invention has been described in detail based on the embodiments as shown. It should be, however, understood that the present invention is not limited to the embodiments as described but can be modified in various manners within a scope not departing from the essence of the invention.

Many widely different embodiments of the present invention may be constructed without departing from the spirit and scope of the present invention. It should be understood that the present invention is not limited to the specific embodiments described in the specification, except as defined in the appended claims.

What is claimed is:

1. A pulse-controlled camera comprising:
    a basic reciprocating member driven by a pulse motor such that said reciprocating member moves in a forward direction from a control reference position by an amount corresponding to a measured distance to a subject and thereafter returns to said control reference position and then that said reciprocating member moves in a backward direction from said control reference position and thereafter returns to said control reference position;
    a distance setting member arranged such that when said basic reciprocating member is driven in the forward direction from said control reference position, said distance setting member is driven in dependence on an amount by which said reciprocating member is driven in the forward direction from said control reference position against a biasing force provided on itself and has a photo-taking lens displaced in a direction of an optical axis thereof by an amount corresponding to said measured distance from a feeding start reference position;
    backstop means urged with an urging force to make an engagement with said distance setting member to prevent said distance setting member from being driven by said biasing force in the backward direction, but pressed by said basic reciprocating member against said urging force for engagement to release said engagement with said distance setting member only when said basic reciprocating member returns to said control reference position from a position to which said basic reciprocating member is driven in the backward direction;
    shutter opening and closing means operated to open a shutter blade of aperture and shutter means when said basic reciprocating member is driven in the backward direction from said control reference position and operated to close said shutter blade when said basic reciprocating member returns to said control reference position from the position to which said basic reciprocating member is driven in the backward direction; and
    photoelectric detection means disposed in parallel with the optical axis of said photo-taking lens to detect a position of said basic reciprocating member.

2. A pulse-controlled camera according to claim 1, further comprising:
    object distance calculating means for calculating an object distance based on object distance information from automatic distance measuring means;
    a lens holding frame holding said photo-taking lens and arranged to be displaceable along the optical axis of said photo-taking lens from said feeding start reference position to a fed position calculated by said object distance calculating means; and
    a lens feeding member for feeding said lens holding frame along the optical axis of said photo-taking lens from said feeding start reference position to said fed position by a motion of itself when rotated in the forward direction from an initial position thereof and for having said lens holding member changed into a state in which said lens holding member may return from a feeding end position to said feeding start reference position when rotated in the backward direction from the feeding end position of said lens holding frame;
    wherein said distance setting member is structured such that when said basic reciprocating member rotates in the forward direction from said control reference position, said distance setting member is synchronized therewith to rotate in the forward direction from the initial position, that when said basic reciprocating member rotates in the backward direction from a position after the forward rotation toward said control reference position, said distance setting member is stopped at the feeding end position by said backstop means, and that when the stop by said backstop means is released by a forward motion of said basic reciprocating member after completion of an exposure operation, said distance setting member returns from the feeding end position to the initial position thereof by a return biasing force applied thereto and has said lens holding frame return from said feeding end position to said feeding start reference position by said return biasing force.

3. A pulse-controlled camera according to claim 1, wherein said distance setting member has a cam mechanism to displace said photo-taking lens in the direction of the optical axis thereof.

4. A pulse-controlled camera according to claim 1, wherein said backstop means comprises a ratchet mechanism.

5. A pulse-controlled camera according to claim 1, wherein said shutter opening and closing means has a drive pin engaging with the shutter blade, a displacement of said drive pin having the shutter blade open and close.

6. A pulse-controlled camera according to claim 1, wherein said photoelectric detection means comprises a photo interrupter.

7. A pulse-controlled camera comprising:
    a basic reciprocating member driven by a pulse motor such that said reciprocating member moves in a forward direction from a control reference position by an amount corresponding to a measured distance to a subject and thereafter returns to said control reference position and then that said reciprocating member moves in a backward direction from said control reference position and thereafter returns to said control reference position;

a distance setting member arranged such that when said basic reciprocating member is driven in the forward direction from said control reference position, said distance setting member is driven in dependence on an amount by which said reciprocating member is driven in the forward direction from said control reference position against a biasing force provided on itself and has a photo-taking lens displaced in a direction of an optical axis thereof by an amount corresponding to said measured distance from a feeding start reference position;

backstop means urged with an urging force to make an engagement with said distance setting member to prevent said distance setting member from being driven by said biasing force in the backward direction, but pressed by said basic reciprocating member against said urging force for the engagement to release said engagement with said distance setting member only when said basic reciprocating member returns to said control reference position from a position to which said basic reciprocating member is driven in the backward direction;

shutter opening and closing means operated to open a shutter blade of aperture and shutter means when said basic reciprocating member is driven in the backward direction from said control reference position and operated to close said shutter blade when said basic reciprocating member returns to said control reference position from the position to which said basic reciprocating member is driven in the backward direction; photoelectric detection means disposed in parallel with the optical axis of said photo-taking lens to detect a position of said basic reciprocating member;

said photoelectric detection means arranged to photoelectrically detect a predetermined proximate position set in the proximity of said control reference position as a change of an output signal thereof;

region border position detecting means arranged to detect a position where the output signal of said photoelectric detection means is changed by driving said pulse motor in the forward direction or in the backward direction; and electric control means for further rotating said pulse motor in the same direction over the position where the output signal of said photoelectric detection means is changed, after said region border position detecting means has detected a border position, and for electrically setting said control reference position by stopping said pulse motor when a supply phase to said pulse motor becomes a phase preliminarily determined.

8. A pulse-controlled camera according to claim 7, wherein said photoelectric detection means is provided with an optical path for detection to photoelectrically detect said control reference position and is arranged to differ a photoelectric output signal in an interrupted condition of said optical path for detection from that in an uninterrupted condition thereof; and wherein said region border position detecting means comprises: a signal generation portion partly projected from said basic reciprocating member and having a width set as a rotation angle conversion width of said basic reciprocating member corresponding to a predetermined number of drive pulses applied to said pulse motor, said signal generation portion having a width edge on a focusing side and a width edge on an exposure side, each of which changes the detection optical path of said photoelectric detection means from the interrupted condition into the uninterrupted condition, when said basic reciprocating member rotates from said control reference position toward a position where a focusing operation is completed and when said basic reciprocating member rotates from said control reference position toward a position where at least said shutter blade is positioned at an exposure start reference position; and electric control means for setting at least as a control reference position calculation point a timing when either of said focusing side width edge and exposure side width edge of said signal generation portion changes the detection optical path from the interrupted condition into the uninterrupted condition, for setting a rotation amount of said basic reciprocating member between said control reference position and said control reference position calculation point as a predetermined number of drive pulses applied to said pulse motor, and for setting as said control reference position a position reached after said pulse motor rotates by said predetermined number of pulses from said control reference position calculation point, in the process of rotation of said basic reciprocating member toward said control reference position from the position where said focusing operation is completed and from the position where said shutter blade is positioned at the exposure start reference position.

9. A pulse-controlled camera according to claim 7, wherein a plane of motion on which said signal generation portion of said region border position detecting means rotates in the forward direction or in the backward direction is located within a cylindrical plane with an axis along the optical axis of said photo-taking lens.

10. A pulse-controlled camera according to claim 7, wherein said aperture and shutter means is provided with correct exposure calculating means for measuring a luminance of the subject to calculate a correct exposure amount and with return biasing means for having said shutter blade follow the forward rotation of said basic reciprocating member to return said shutter blade from a position of correct stop aperture to said exposure start reference position, and wherein said shutter blade is opened from said exposure start reference position to the position of correct stop aperture by a backward rotation operation of said basic reciprocating member controlled with a time set based on the correct exposure amount determined by said correct exposure calculating means and is closed from the position of correct stop aperture to said exposure start reference position by a biasing force of said return biasing means.

11. A pulse-controlled camera according to claim 7, wherein a width of drive pulses applied to said pulse motor at a selected step is differed from that at other unselected steps, said selected step being among a step of forward rotation of said basic reciprocating member from said control reference position, a step of backward rotation of said basic reciprocating member from a position after said forward rotation toward said control reference position, a step of backward rotation of said basic reciprocating member from said control reference position, and a step of forward rotation at least from a position where a correct stop aperture of said shutter blade is formed, toward said control reference position.

12. A pulse-controlled camera according to claim 7, wherein a width of drive pulses applied to said pulse motor at a selected step is varied in said selected step, said selected step being among a step of forward rotation of said basic reciprocating member from said control reference position, a step of backward rotation of said basic reciprocating member from a position after said forward rotation toward said control reference position, a step of backward rotation of said basic reciprocating member from said control reference position, and a step of forward rotation from a position where a correct stop aperture of said shutter blade is formed, toward said control reference position.

13. A pulse-controlled camera according to claim 7, wherein said distance setting member has a cam mechanism to displace said photo-taking lens in the direction of the optical axis thereof.

14. A pulse-controlled camera according to claim 7, wherein said backstop means comprises a ratchet mechanism.

15. A pulse-controlled camera according to claim 7, wherein said shutter opening and closing means has a drive pin engaging with the shutter blade, a displacement of said drive pin having the shutter blade open and close.

16. A pulse-controlled camera according to claim 8, wherein said photoelectric detection means comprises a photo interrupter.

17. A pulse-controlled camera according to claim 8, wherein said photoelectric detection means comprises a photo reflector.

18. A pulse controlled camera according to claim 8, wherein a plane of motion on which said signal generation portion of said region border position detecting means rotates in the forward direction or in the backward direction is located within a cylindrical plane with an axis along the optical axis of said photo-taking lens.

19. A method for setting a control reference position of a pulse-controlled camera in which a pulse motor conducts drives of an operation to feed a photo-taking lens to an in-focus position depending upon an object distance and of an operation to open a shutter blade at least up to a position of correct stop aperture based on a correct exposure amount depending upon a luminance of a subject, comprising steps of:

setting the control reference position of said camera between a feeding start reference position from which said photo-taking lens is started feeding to said in-focus position and an exposure start reference position from which said shutter blade is started opening to the position of correct stop aperture, and setting at least one predetermined proximate position in the proximity of said control reference position;

photoelectrically detecting as a change in an output signal of photoelectric detection means a border position between a region ranging from said control reference position to said predetermined proximate position and an outside region extending outside of said predetermined proximate position opposite to said control reference position;

driving said pulse motor in at least one direction of forward and backward directions to detect a position where the output signal of said photoelectric detection means is changed; and applying a predetermined number of drive pulses to said pulse motor from the position where the output signal of said photoelectric detection means is changed, when said border position is detected by the output signal change of said photoelectric detection means, whereby said control reference position is set in an electrically controlled manner.

* * * * *